(12) United States Patent
Wu et al.

(10) Patent No.: US 9,526,043 B2
(45) Date of Patent: Dec. 20, 2016

(54) SOFT HANDOVER METHOD AND DEVICE

(71) Applicant: Huawei Technologies Co., Ltd., Shenzhen, Guangdong (CN)

(72) Inventors: Shaoyun Wu, Shanghai (CN); Yong Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 424 days.

(21) Appl. No.: 14/306,052

(22) Filed: Jun. 16, 2014

(65) Prior Publication Data

US 2014/0295852 A1   Oct. 2, 2014

Related U.S. Application Data

(63) Continuation of application No. PCT/CN2011/084117, filed on Dec. 16, 2011.

(51) Int. Cl.
*H04W 36/00* (2009.01)
*H04W 36/18* (2009.01)
(Continued)

(52) U.S. Cl.
CPC ......... *H04W 36/0066* (2013.01); *H04W 36/18* (2013.01); *H04W 36/04* (2013.01); *H04W 84/045* (2013.01)

(58) Field of Classification Search
CPC .... H04W 84/045; H04W 36/08; H04W 88/16; H04W 92/24; H04W 36/0083; H04W 36/18; H04W 76/022; H04W 76/045; H04W 8/08; H04L 12/4633; H04L 12/66; H04L 41/0806
(Continued)

(56) References Cited

U.S. PATENT DOCUMENTS

| 2003/0036387 A1 | 2/2003 | Kovacs et al. |
| 2003/0129981 A1 | 7/2003 | Kim |
| 2010/0041405 A1* | 2/2010 | Gallagher ............... H04W 8/02 455/436 |

FOREIGN PATENT DOCUMENTS

| CN | 101466125 A | 6/2009 |
| CN | 101772099 A | 7/2010 |

(Continued)

OTHER PUBLICATIONS

"Discussion about Soft Handover for Enhanced H2H Mobility," 3GPP TSG-RAN WG3 #69, Madrid, Spain, R3-102062, 3$^{rd}$ Generation Partnership Project, Valbonne, France (Aug. 23-27, 2010).
(Continued)

*Primary Examiner* — Charles Appiah
*Assistant Examiner* — Edward Zhang
(74) *Attorney, Agent, or Firm* — Leydig, Voit & Mayer, Ltd.

(57) ABSTRACT

Embodiments of the present invention provide a soft handover method and device. The soft handover method includes: receiving a soft handover request sent by a home access node, where the soft handover request includes user plane information of the home access node and an identifier of an RNC; establishing a signaling connection mapping between the home access node and the RNC, and forwarding the soft handover request to the RNC; receiving a soft handover response returned by the RNC; establishing a user plane connection mapping between the home access node and the RNC, forwarding the soft handover response to an HNB based on forwarding user plane information, and forwarding user plane data. The technical solutions of the present invention implement a soft handover process between a macro cell and a home access node cell.

22 Claims, 22 Drawing Sheets

(51) Int. Cl.
*H04W 84/04* (2009.01)
*H04W 36/04* (2009.01)

(58) Field of Classification Search
USPC .................................................. 455/436–444
See application file for complete search history.

(56) References Cited

FOREIGN PATENT DOCUMENTS

EP          2375807 A1   10/2011
WO   WO 2011067816 A1    6/2011

OTHER PUBLICATIONS

"Macro to femto enhanced mobility for 3G," 3GPP TSG-RAN WG3 Meeting #73bis, Zhuhai, P.R. China, R3-112424, $3^{rd}$ Generation Partnership Project, Valbonne, France (Oct. 10-14, 2011).

"$3^{rd}$ Generation Partnership Project; Technical Specification Group RAN; UMTS and LTE; Mobility Enhancements for H(e)NB (Release 11)," 3GPP TR 37.803, V0.1.2, pp. 1-15, $3^{rd}$ Generation Partnership Project, Valbonne, France (Jun. 2011).

"TP for Rel-11 Macro to HNB Enhanced Mobility," 3GPP TSG-RAN WG3#74, San Francisco, USA, R3-112996, $3^{rd}$ Generation Partnership Project, Valbonne, France (Nov. 14-18, 2011).

\* cited by examiner

SOFT HANDOVER METHOD AND DEVICE

CROSS-REFERENCE TO RELATED APPLICATIONS

This application is a continuation of International Patent Application No. PCT/CN2011/084117, filed on Dec. 16, 2011, which is hereby incorporated by reference in its entirety.

FIELD OF THE INVENTION

The present invention relates to mobile communications technologies, and in particular, to a soft handover method and device.

BACKGROUND OF THE INVENTION

Indoor coverage of universal mobile telecommunications system (UMTS) signals has always been a problem that is confronted by users and operators. The advent of the Femto network is a good solution to this problem. Key network elements of the Femto network are a home NodeB (HNB) and a home NodeB gateway (HNB-GW). The HNB uses a standard air interface; a fixed broadband access network is used between the HNB and the HNB-GW as a backhaul network; after convergence of the HNB-GW, a standard Iu interface is used to access the core network, and in this way supplemental coverage of macro cell signals is achieved. Moreover, a Femto cell has a small coverage range, capable of conducting user services more finely. Therefore, the Femto network is receiving more and more attention from the operators.

Location management is one of the most important functions of devices at the core network (CN) side and at the radio access network (RAN) end. When a user equipment (UE) from coverage of a cell gradually enters coverage of another cell, a radio network controller (Radio RNC) of the original cell and an RNC of the new cell complete context switch through signaling exchange, to ensure that the UE is capable of receiving or initiating services in the new cell. The 3rd generation partnership project (3GPP) defines a handover (relocation) process to meet requirements of the foregoing context switch between RNCs. According to different implementation manners, the handover is categorized into hard handover and soft handover. For the soft handover, an Iur interface is used to manage radio resources between RNCs, so that without context transfer, a UE is capable of entering a new cell in a lossless manner. Comparatively speaking, the soft handover has better user experience and a higher success rate of handover, and therefore, the soft handover is a preferred handover manner in a macro network.

However, due to a special nature of the Femto network, the 3GPP fails to define implementation of the soft handover in the Femto network currently. Therefore, when a macro cell is adjacent to an HNB cell, a soft handover process fails to be initiated.

SUMMARY OF THE INVENTION

The present invention provides a soft handover method and device, capable of implementing a process of a soft handover between a macro cell and an HNB cell.

For a first aspect, the present invention provides a soft handover method, which includes:

receiving, by a home access gateway, a soft handover request sent by a home access node, where the soft handover request includes user plane information of the home access node and an identifier of a radio network controller RNC;

establishing, by the home access gateway according to the identifier of the RNC, a signaling connection mapping between the home access node and the RNC, and forwarding the soft handover request to the RNC based on forwarding connection resource information allocated to the RNC, where the forwarding connection resource information includes information pointing to the home access gateway;

receiving, by the home access gateway, a soft handover response returned by the RNC according to the soft handover request, where the soft handover response includes connection resource information of the RNC; and establishing, by the home access gateway, a user plane connection mapping between the home access node and the RNC according to the user plane information of the home access node, the forwarding connection resource information, forwarding user plane information allocated to the home access node, and the connection resource information of the RNC, and forwarding the soft handover response to the home access node based on the forwarding user plane information, where the forwarding user plane information includes information pointing to the home access gateway.

For the first aspect, the present invention further provides a soft handover method, which includes:

sending, by a home access node, a soft handover request to a home access gateway, to enable the home access gateway to establish a signaling connection mapping between the home access node and a radio network controller RNC according to the soft handover request, where the soft handover request includes user plane information of the home access node and an identifier of the RNC; and receiving, by the home access node, a soft handover response sent by the home access gateway, where the soft handover response is returned by the RNC to the home access gateway according to the soft handover request forwarded by the home access gateway, and is forwarded to the home access node after the home access gateway establishes a user plane connection mapping between the home access node and the RNC according to the soft handover response, the soft handover response includes forwarding user plane information allocated by the home access gateway to the home access node, and the forwarding user plane information includes information pointing to the home access gateway.

For a second aspect, the present invention provides a soft handover method, which includes:

receiving, by a home access gateway, a soft handover request sent by a radio network controller RNC, where the soft handover request includes connection resource information of the RNC and an identifier of a home NodeB home access node;

establishing, by the home access gateway, according to the identifier of the home access node, a signaling connection mapping between the RNC and the home access node, and forwarding the soft handover request to the home access node based on forwarding user plane information allocated to the home access node, where the forwarding user plane information includes information pointing to the home access gateway;

receiving, by the home access gateway, a soft handover response returned according to the soft handover request by the home access node, where the soft handover response includes user plane information of the home access node; and establishing, by the home access gateway, a user plane connection mapping between the home access node and the RNC according to the user plane information of the home access node, the forwarding user plane information, forwarding connection resource information allocated to the RNC, and the connection resource information of the RNC, and forwarding the soft handover response to the RNC based on the forwarding connection resource information, where the forwarding connection resource information includes information pointing to the home access gateway.

For the second aspect, the present invention further provides a soft handover method, which includes:

sending, by a radio network controller RNC, a soft handover request to a home access gateway, to enable the home access gateway to establish a signaling connection mapping between a home access node and the RNC according to the soft handover request, where the soft handover request includes connection resource information of the RNC and an identifier of the home access node; and receiving, by the RNC, a soft handover response sent by the home access gateway, where the soft handover response is returned by the home access node to the home access gateway according to the soft handover request forwarded by the home access gateway, and is forwarded to the RNC after the home access gateway establishes a user plane connection mapping between the home access node and the RNC according to the soft handover response, the soft handover response includes forwarding connection resource information allocated by the home access gateway to the RNC, and the forwarding connection resource information includes information pointing to the home access gateway.

The present invention further provides a soft handover method from the second aspect, which includes:

receiving, by a home access node, a soft handover request forwarded, based on forwarding user plane information allocated to the home access node, by a home access gateway, where the soft handover request includes an identifier of the home access node, the soft handover request is sent by a radio network controller RNC to the home access gateway, and forwarded after the home access gateway establishes a signaling connection mapping between the RNC and the home access node according to the soft handover request, and the forwarding user plane information includes information pointing to the home access gateway; and sending, by the home access node, a soft handover response to the home access gateway according to the soft handover request, where the soft handover response includes user plane information of the home access node, to enable the home access gateway to establish a user plane connection mapping between the home access node and the RNC according to the soft handover response, and forward the soft handover response to the RNC.

For the first aspect, the present invention provides a home access gateway, which includes:

a first request receiving module, configured to receive a soft handover request sent by a home access node, where the soft handover request includes user plane information of the home access node and an identifier of a radio network controller RNC;

a first signaling relationship processing module, configured to establish, according to the identifier of the RNC, a signaling connection mapping between the home access node and the RNC, and forward the soft handover request to the RNC based on forwarding connection resource information allocated to the RNC, where the forwarding connection resource information includes information pointing to the home access gateway;

a first response receiving module, configured to receive a soft handover response returned by the RNC according to the soft handover request, where the soft handover response includes connection resource information of the RNC; and a first user relationship processing module, configured to establish a user plane connection mapping between the home access node and the RNC according to the user plane information of the home access node, the forwarding connection resource information, forwarding user plane information allocated to the home access node, and the connection resource information of the RNC, and forward the soft handover response to the home access node based on the forwarding user plane information, where the forwarding user plane information includes information pointing to the home access gateway.

For the first aspect, the present invention provides a home access node, which includes:

a first handover request sending module, configured to send a soft handover request to a home access gateway, to enable the home access gateway to establish a signaling connection mapping between the home access node and a radio network controller RNC according to the soft handover request, where the soft handover request includes user plane information of the home access node and an identifier of the RNC; and a first handover response receiving module, configured to receive a soft handover response sent by the home access gateway, where the soft handover response is returned by the RNC to the home access gateway according to the soft handover request forwarded by the home access gateway, and is forwarded to the home access node after the home access gateway establishes a user plane connection mapping between the home access node and the RNC according to the soft handover response, the soft handover response includes forwarding user plane information allocated by the home access gateway to the home access node, and the forwarding user plane information includes information pointing to the home access gateway.

For the second aspect, the present invention provides a home access gateway, which includes:

a second request receiving module, configured to receive a soft handover request sent by a radio network controller RNC, where the soft handover request includes connection resource information of the RNC and an identifier of a home NodeB home access node;

a second signaling relationship processing module, configured to establish, according to the identifier of the home access node, a signaling connection mapping between the RNC and the home access node, and forward the soft handover request to the home access node based on forwarding user plane information allocated to the home access node, where the forwarding user plane information includes information pointing to the home access gateway;

a second response receiving module, configured to receive a soft handover response returned according to the soft handover request by the home access node, where the soft handover response includes user plane information of the home access node; and a second user relationship processing module, configured to establish a user plane connection mapping between the home access node and the RNC according to the user plane information of the home access node, the forwarding user plane information, forwarding connection resource information allocated to the RNC, and the connection resource information of the RNC, and forward the soft handover response to the RNC based on the forwarding connection resource information, where the forwarding connection resource information includes information pointing to the home access gateway.

For the second aspect, the present invention provides a radio network controller RNC, which includes:

a second handover request sending module, configured to send a soft handover request to a home access gateway, to enable the home access gateway to establish a signaling connection mapping between a home access node and the RNC according to the soft handover request, where the soft handover request includes connection resource information of the RNC and an identifier of the home access node; and a second handover response receiving module, configured to receive a soft handover response sent by the home access gateway, where the soft handover response is returned by the home access node to the home access gateway according to the soft handover request forwarded by the home access gateway, and is forwarded to the RNC after the home access gateway establishes a user plane connection mapping between the home access node and the RNC according to the soft handover response, the soft handover response includes forwarding connection resource information allocated by the home access gateway to the RNC, and the forwarding connection resource information includes information pointing to the home access gateway.

For the second aspect, the present invention provides a home access node, which includes:

a handover request receiving module, configured to receive a soft handover request which is forwarded by a home access gateway based on forwarding user plane information allocated to the home access node, where the soft handover request includes an identifier of the home access node, the soft handover request is sent by a radio network controller RNC to the home access gateway, and forwarded after the home access gateway establishes a signaling connection mapping between the RNC and the home access node according to the soft handover request, and the forwarding user plane information includes information pointing to the home access gateway; and a handover response sending module, configured to send a soft handover response to the home access gateway according to the soft handover request, where the soft handover response includes user plane information of the home access node, to enable the home access gateway to establish a user plane connection mapping between the home access node and the RNC according to the soft handover response, and forward the soft handover response to the RNC.

For the soft handover method, the home access gateway, and the home access node that are provided according to the present invention for the first aspect, when the home access node initiates a soft handover operation to an RNC, the home access gateway establishes a signaling connection with the RNC, and the home access gateway establishes a signaling connection mapping and a user plane connection mapping between the home access node and the RNC, to complete forwarding of signaling and user plane data between the home access node and the RNC, thereby implementing a soft handover between a macro cell and a home access node cell.

For the soft handover method, the home access gateway, the home access node, and the radio network controller RNC that are provided according to the present invention for the second aspect, when the RNC initiates a soft handover operation to the home access node, a signaling connection with the home access gateway is established, and the home access gateway establishes a signaling connection mapping and a user plane connection mapping between the home access node and the RNC, to complete forwarding of signaling and user plane data between the home access node and the RNC, thereby implementing a soft handover between a macro cell and a home access node cell.

DETAILED DESCRIPTION OF THE EMBODIMENTS

Figure 1A:
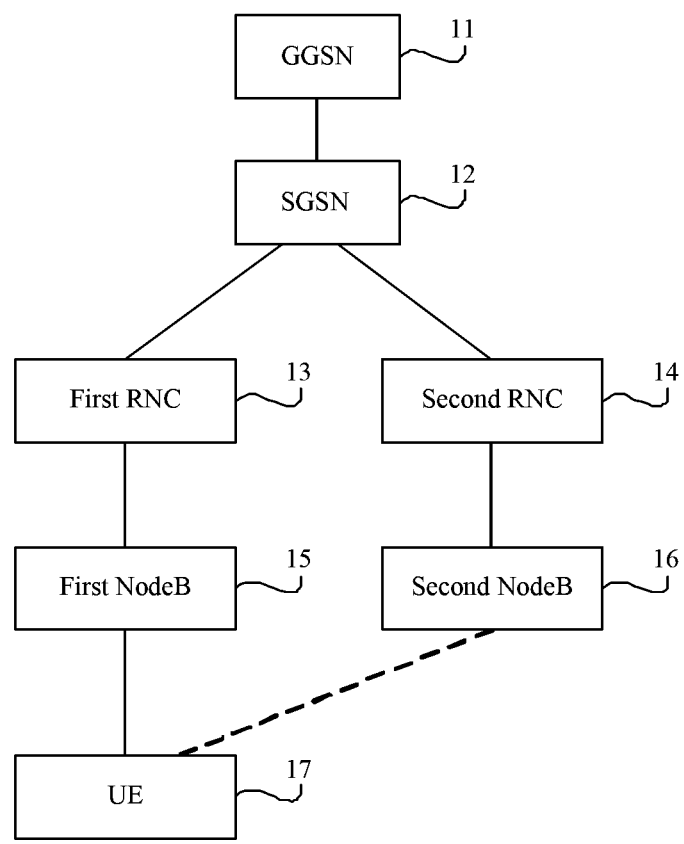
FIG. 1A is a schematic network topological diagram of a soft handover process in the prior art.

FIG. 1A is a schematic network topological diagram of a soft handover process in the prior art. As shown in FIG. 1A, the network mainly includes: a general packet radio service (General Packet Radio Service, GPRS) gateway GPRS support node (Gateway GPRS Support Node, GGSN) 11, a serving GPRS support node (Serving GPRS Support Node, SGSN) 12 connected to the GGSN 11, a first RNC 13 and a second RNC 14 that are connected to the SGSN 12, a first NodeB (NodeB) 15 connected to the first RNC 13, and a second NodeB 16 connected to the second RNC 14. The first RNC 13 and the first NodeB 15 form a first macro cell, and the second RNC 14 and the second NodeB 16 form a second macro cell. Assume that a UE 17 gradually moves from the first macro cell to the second macro cell. Before a soft handover, the UE 17 accesses the first NodeB 15; devices where context information of the UE 17 is located include: the GGSN 11, the SGSN 12, and the first RNC 13; data paths of the UE 17 include: the GGSN 11, the SGSN 12, the first RNC 13, and the first NodeB 15. After the soft handover, the devices where the context information of the UE 17 is located remain unchanged, and still include: the GGSN 11, the SGSN 12, and the first RNC 13; the data paths of the UE 17 change, and the data paths of the UE 17 after the soft handover include: the GGSN 11, the SGSN 12, the first RNC 13, the second RNC 14, and the second NodeB 16.

It may be seen from the foregoing that: when the soft handover occurs, the context information of the UE 17 does not transfer, but the first RNC 13 initiates a request to establish a path from the first RNC 13 to the second RNC 14. Meanwhile, corresponding air interface resources are allocated to the second RNC 14, to enable a data packet of the UE 17 to be transmitted through the path between the first RNC 13 and the second RNC 14 and through the second RNC 14. Compared with a hard handover, the soft handover has better user experience and a higher success rate of handover.

Figure 1B:
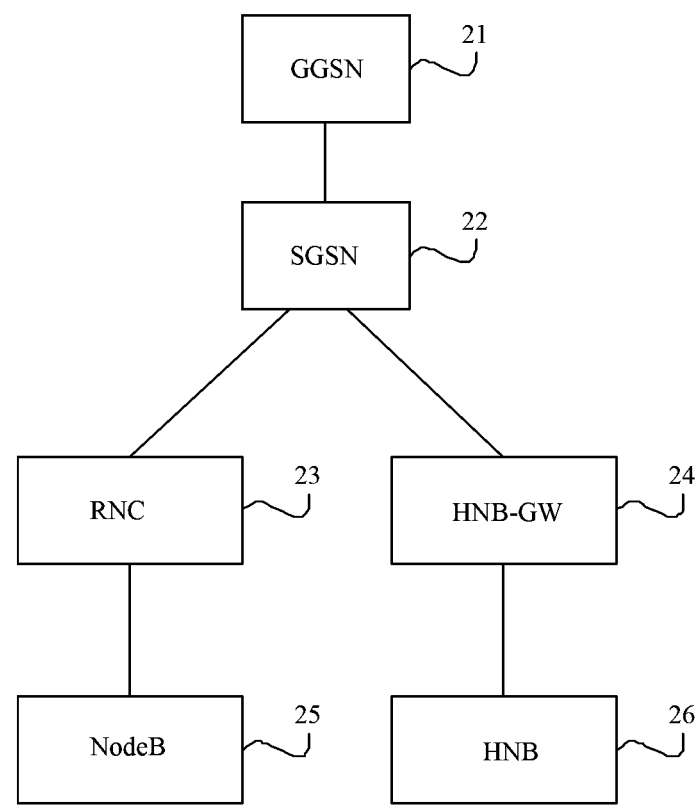
FIG. 1B is a schematic network topological diagram of a macro cell adjacent to an HNB cell according to an embodiment of the present invention.

FIG. 1B is a schematic network topological diagram of a macro cell adjacent to an HNB cell according to an embodiment of the present invention. As shown in FIG. 1B, the network mainly includes: a GGSN 21, an SGSN 22 connected to the GGSN 21, an RNC 23 and an HNB-GW 24 that are connected to the SGSN 22, a NodeB 25 connected to the RNC 23, and an HNB 26 connected to the HNB-GW 24.

For a network topology where a macro cell is adjacent to an HNB cell, if the foregoing soft handover concept is directly applied, the following two soft handover processes are obtained.

Figure 1C:
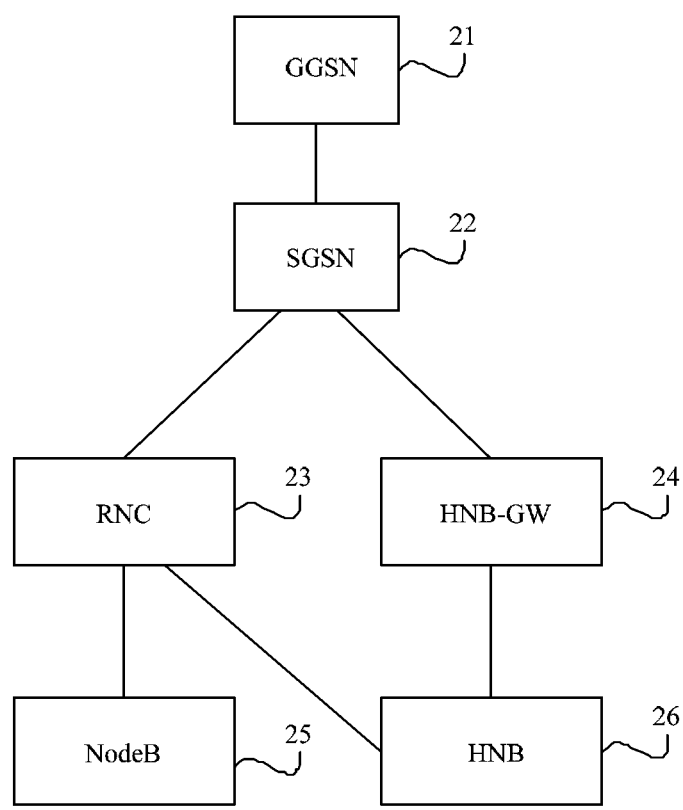
FIG. 1C is a schematic network topological diagram of an HNB and an RNC establishing a signaling connection and completing a soft handover function.

A first soft handover process includes: establishing, by the HNB 26, a signaling connection with the RNC 23 through an Iur interface, and completing a soft handover function, where the network topology after the connection is shown in FIG. 1C. The soft handover process is the same as the process of the soft handover between two macro cells (that is, two RNCs) in the prior art.

However, the number of the HNBs 26 is huge, possibly reaching thousands of HNBs 26, and the number of Iur connections of the RNC 23 is far from being able to meet the demands of such enormous HNBs 26. In addition, too many signaling connections are very likely to result in impacts on a network. Furthermore, for the RNC 23, the number and locations of the HNBs 26 often change, and therefore connection relationships between the RNC 23 and the HNBs 26 fail to be statically planned, resulting in a great maintenance cost. Therefore, the soft handover process is not so practical, and fails to resolve the problem of the soft handover between a macro cell and an HNB cell.

Figure 1D:
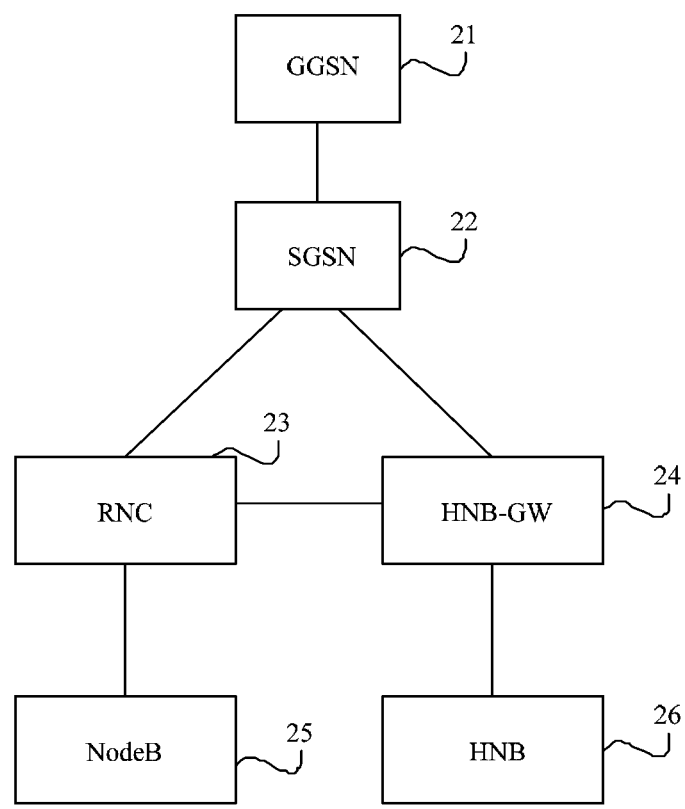
FIG. 1D is a schematic network topological diagram of an HNB-GW and an RNC establishing a signaling connection and completing a soft handover function.

A second soft handover process includes: establishing, by the HNB-GW 24, a connection with the RNC 23 through an Iur interface, and completing the soft handover function, where the network topology after the connection is shown in FIG. 1D. The soft handover process is also the same as the process of the soft handover between two RNCs in the prior art.

However, for the HNB-GW 24, functions of an RNC needs to be implemented. That is, a complete radio network subsystem application part (Radio Network Subsystem Application Part, RNSAP) protocol stack needs to be included, which does not conform to the implementation architecture of the HNB-GW 24 stipulated by the protocol at present, and the cost is high. Therefore, the soft handover process is not so practical either, and fails to resolve the problem of the soft handover between a macro cell and an HNB cell.

Accordingly, the present invention provides a soft handover method implemented based on the present architecture, which is used to resolve a soft handover problem when a macro cell is adjacent to an HNB cell, and also overcomes the foregoing problems. The soft handover method according to the present invention is described in the following in detail through specific embodiments.

A soft handover method according to an embodiment of the present invention that is described from the perspective of a home access gateway includes:

receiving, by a home access gateway, a soft handover request sent by a home access node, where the soft handover request includes user plane information of the home access node and an identifier of an RNC;

establishing, by the home access gateway according to the identifier of the RNC, a signaling connection mapping between the home access node and the RNC, and forwarding the soft handover request to the RNC based on forwarding connection resource information allocated to the RNC, where the forwarding connection resource information includes information pointing to the home access gateway;

receiving, by the home access gateway, a soft handover response returned by the RNC according to the soft handover request, where the soft handover response includes connection resource information of the RNC; and establishing, by the home access gateway, a user plane connection mapping between the home access node and the RNC according to the user plane information of the home access node, the forwarding connection resource information, forwarding user plane information allocated to the home access node, and the connection resource information of the RNC, and forwarding the soft handover response to the home access node based on the forwarding user plane information, where the forwarding user plane information includes information pointing to the home access gateway.

A soft handover method according to an embodiment of the present invention that is described from the perspective of a home access node includes:

sending, by a home access node, a soft handover request to a home access gateway, to enable the home access gateway to establish a signaling connection mapping between the home access node and an RNC according to the soft handover request, where the soft handover request includes user plane information of the home access node and an identifier of the RNC; and receiving, by the home access node, a soft handover response sent by the home access gateway, where the soft handover response is returned by the RNC to the home access gateway according to the soft handover request forwarded by the home access gateway, and is forwarded by the home access gateway to the home access node after the home access gateway establishes a user plane connection mapping between the home access node and the RNC according to the soft handover response, the soft handover response includes forwarding user plane information allocated by the home access gateway to the home access node, and the forwarding user plane information includes information pointing to the home access gateway.

A soft handover method according to another embodiment of the present invention that is described from the perspective of a home access gateway includes:

receiving, by a home access gateway, a soft handover request sent by an RNC, where the soft handover request includes connection resource information of the RNC and an identifier of a home access node;

establishing, by the home access gateway according to the identifier of the home access node, a signaling connection mapping between the RNC and the home access node, and forwarding the soft handover request to the home access node based on forwarding user plane information allocated to the home access node, where the forwarding user plane information includes information pointing to the home access gateway;

receiving, by the home access gateway, a soft handover response returned by the home access node according to the soft handover request, where the soft handover response includes user plane information of the home access node; and establishing, by the home access gateway, a user plane connection mapping between the home access node and the RNC according to the user plane information of the home access node, the forwarding user plane information, forwarding connection resource information allocated to the RNC, and the connection resource information of the RNC, and forwarding the soft handover response to the RNC based on the forwarding connection resource information, where the forwarding connection resource information includes information pointing to the home access gateway.

A soft handover method according to another embodiment of the present invention that is described from the perspective of an RNC includes:

sending, by an RNC, a soft handover request to a home access gateway, to enable the home access gateway to establish a signaling connection mapping between a home access node and the RNC according to the soft handover request, where the soft handover request includes connection resource information of the RNC and an identifier of the home access node; and receiving, by the RNC, a soft handover response sent by the home access gateway, where the soft handover response is returned by the home access node to the home access gateway according to the soft handover request forwarded by the home access gateway, and is forwarded by the home access gateway to the RNC after the home access gateway establishes a user plane connection mapping between the home access node and the RNC according to the soft handover response, the soft handover response includes forwarding connection resource information allocated by the home access gateway to the RNC, and the forwarding connection resource information includes information pointing to the home access gateway.

A soft handover method according to another embodiment of the present invention that is described from the perspective of a home access node includes:

receiving, by a home access node, a soft handover request forwarded by a home access gateway based on forwarding user plane information allocated to the home access node, where the soft handover request includes an identifier of the home access node, the soft handover request is sent by an RNC to the home access gateway, and forwarded after the home access gateway establishes a signaling connection mapping between the RNC and the home access node according to the soft handover request, and the forwarding user plane information includes information pointing to the home access gateway; and sending, by the home access node, a soft handover response to the home access gateway according to the soft handover request, where the soft handover response includes user plane information of the home access node, to enable the home access gateway to establish a user plane connection mapping between the home access node and the RNC according to the soft handover response, and forwarding the soft handover response to the RNC.

In each of the foregoing embodiments, the home access gateway is an HNB-GW, and the home access node is an HNB. Alternatively, the home access gateway is an HeNB-GW, and the home access node is an HeNB.

In each of the foregoing embodiments, the home access node establishes a signaling connection with the RNC through the home access gateway, and the home access gateway establishes a signaling connection mapping and a user plane connection mapping between the home access node and the RNC, to complete forwarding of signaling and user plane data between the home access node and the RNC, thereby implementing a soft handover between a macro cell and a home access node cell.

The process of the soft handover method according to the present invention is described in detail in the following embodiments, where in each of the following embodiments the home access gateway is an HNB-GW, and the home access node is an HNB.

Figure 2:
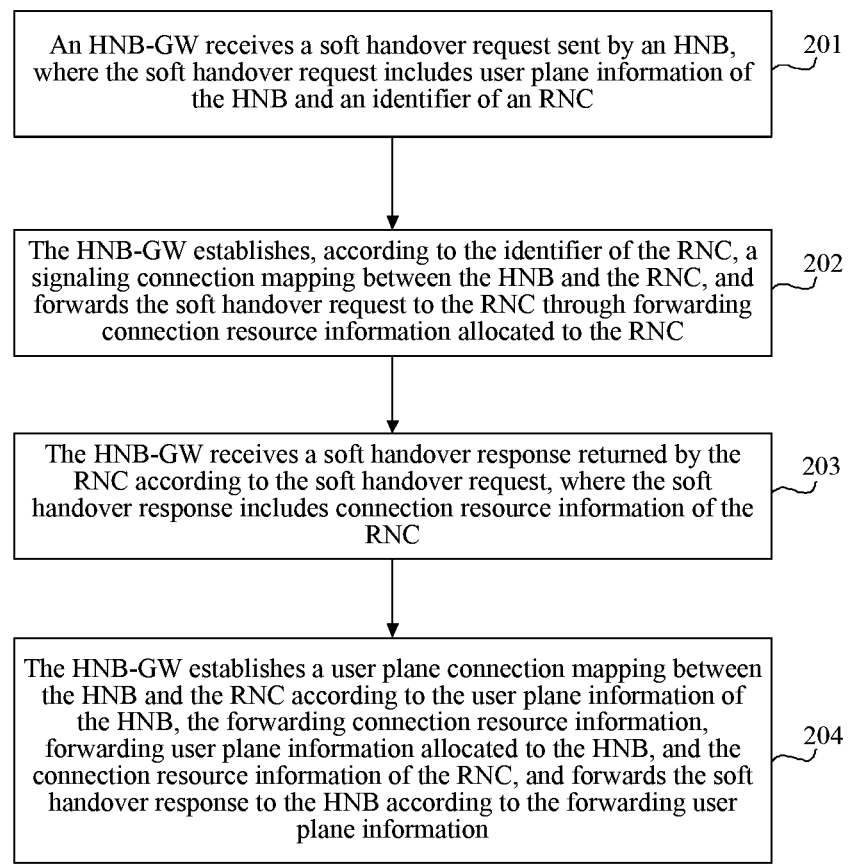
FIG. 2 is a flowchart of a soft handover method performed by an HNB and an RNC according to an embodiment of the present invention.

FIG. 2 is a flowchart of a soft handover method performed by an HNB and an RNC according to an embodiment of the present invention. As shown in FIG. 2, the method according to the embodiment includes the following steps:

Step 201: An HNB-GW receives a soft handover request sent by an HNB, where the soft handover request includes user plane information of the HNB and an identifier of an RNC.

In the embodiment, the HNB implements a complete RNSAP protocol stack, provides a logical Iur interface, and performs necessary signaling and resource processing such as measurement initiating and radio resource management.

The HNB makes a soft handover decision according to information such as measured signal strength, and initiates a soft handover request to the RNC through the HNB-GW when a soft handover requirement is met. Therefore, when the soft handover requirement is met, the HNB sends a soft handover request to the HNB-GW, where the soft handover request carries user plane information of the HNB and an identifier of the RNC of handover destination.

The user plane information of the HNB mainly includes a user plane internet protocol (IP) address and a user datagram protocol (UDP) port number, which is not limited here. The identifier of the RNC may be obtained from a signal measured by the HNB.

Step 202: The HNB-GW establishes, according to the identifier of the RNC, a signaling connection mapping between the HNB and the RNC, and forwards the soft handover request to the RNC based on forwarding connection resource information allocated to the RNC.

In the embodiment, the HNB-GW establishes a signaling connection with the RNC by configuring a physical Iur interface.

After receiving the soft handover request sent by the HNB, the HNB-GW obtains, from the soft handover request, the user plane information of the HNB and the identifier of the RNC, records the user plane information of the HNB, and simultaneously identifies and addresses the RNC according to the identifier of the RNC.

In addition, an identifier that may uniquely identify the HNB is stored in advance on the HNB-GW. The identifier of the HNB is generally determined by the HNB-GW according to a registration request sent by the HNB. During communication, the HNB-GW identifies an HNB according to the stored identifiers of HNBs. Therefore, when receiving a soft handover request, the HNB-GW learns and obtains the identifier of the HNB that sends the soft handover request. The identifier of the HNB may be a name (id) or a stream control transmission protocol (SCTP) coupling number of the HNB.

The HNB-GW identifies, according to the identifier of the RNC, that the HNB needs assistance to perform the soft handover, and binds the identifier of the HNB with the identifier of the RNC, so as to establish a signaling connection mapping between the HNB and the RNC. The HNB further allocates the forwarding connection resource information used for establishing a connection with the RNC, and forwards the soft handover request to the RNC based on the allocated forwarding connection resource information.

The forwarding connection resource information includes information pointing to the HNB-GW. The forwarding connection resource information varies according to different link media between the HNB-GW and the RNC. For example, if the link medium between the HNB-GW and the RNC is IP over Ethernet, the forwarding connection resource information mainly includes a user plane IP address and a UDP port number that point to the HNB-GW. If the link medium between the HNB-GW and the RNC is asynchronous transfer mode (ATM), the forwarding connection resource information mainly includes a channel identifier, such as a virtual path identifier (VPI), a virtual channel identifier (VCI), and a channel ID (CID), which points to the HNB-GW and is needed to establish an ATM adaptation layer type 2 (AAL2) link. The VPI and the VCI are used to distinguish different permanent virtual circuits (PVC), and the CID is used to distinguish a user in a PVC.

Specifically, after the RNC is addressed according to the identifier of the RNC, the HNB-GW may delete the identifier of the RNC from the soft handover request, replace the user plane information of the HNB in the soft handover request with the allocated forwarding connection resource information, and then send the soft handover request to the RNC. For example, if the link medium between the HNB-GW and the RNC is IP over Ethernet, the HNB-GW replaces a user plane IP address and a UDP port number of the HNB in the soft handover request with the user plane IP address and the UDP port number that point to the HNB-GW and are allocated by the HNB-GW. If the link medium between the HNB-GW and the RNC is ATM, the HNB-GW replaces the user plane IP address and the UDP port number of the HNB in the soft handover request with the VPI, the VCI, and the CID that point to the HNB-GW and are allocated by the HNB-GW.

Step 203: The HNB-GW receives a soft handover response returned by the RNC according to the soft handover request, where the soft handover response includes connection resource information of the RNC.

After the HNB-GW forwards the soft handover request to the RNC, the RNC performs operations such as resource allocation to prepare for the soft handover, and returns a soft handover response to the HNB-GW, where the soft handover response carries the connection resource information of the RNC. The connection resource information of the RNC is also related to the link medium between the HNB-GW and the RNC. If the link medium between the HNB-GW and the RNC is IP over Ethernet, the connection resource information of the RNC mainly includes a user plane IP address and a UDP port number of the RNC. If the link medium between the HNB-GW and the RNC is ATM, the connection resource information of the RNC mainly includes a channel identifier, such as a VPI, a VCI, and a CID, which is needed to establish an AAL2 link.

The HNB-GW receives the soft handover response sent by the RNC, obtains, from the soft handover response, the connection resource information of the RNC, and records the connection resource information of the RNC.

Step 204: The HNB-GW establishes a user plane connection mapping between the HNB and the RNC according to the user plane information of the HNB, the forwarding connection resource information, forwarding user plane information allocated to the HNB, and the connection resource information of the RNC, and forwards the soft handover response to the HNB based on the forwarding user plane information.

In the embodiment, the HNB-GW further allocates, to the HNB, the forwarding user plane information, which is used for establishing a connection with the HNB during the soft handover process. The forwarding user plane information includes information pointing to the HNB-GW. The forwarding user plane information mainly includes a user plane IP address and a UDP port number that point to the HNB-GW. The HNB-GW may allocate the forwarding user plane information to the HNB when receiving the soft handover request from the HNB or allocate the forwarding user plane information to the HNB when receiving the soft handover response.

To ensure that user plane data between the HNB and the RNC can be mutually forwarded, the HNB-GW binds the user plane information of the HNB, the forwarding user plane information, the forwarding connection resource information, and the connection resource information of the RNC, so as to establish a user plane connection mapping between the HNB and the RNC.

Then, the HNB-GW replaces the connection resource information of the RNC in the soft handover response with the forwarding user plane information pointing to the HNB-GW and allocated by the HNB-GW, and sends the soft handover response to the HNB.

At this moment, the HNB-GW establishes the signaling connection mapping and the user plane connection mapping between the HNB and the RNC, so that signaling and user plane data between the HNB and the RNC may be successfully forwarded, thereby implementing the soft handover between the HNB and the RNC.

In the embodiment, the HNB-GW implements RNSAP protocol stack proxy, provides a physical Iur interface, and establishes a signaling connection with the RNC, to enable the HNB to establish a logical connection with the RNC; signaling and user plane data exchange between the HNB and the RNC is completed through the HNB-GW, thereby implementing the soft handover process, and resolving the soft handover problem when a macro cell is adjacent to an HNB cell. The soft handover has a short time delay, and a higher success rate of handover compared with the hard handover, therefore implementing the soft handover between an HNB cell and an RNC cell and improving user experience. Moreover, due to proxy of the HNB-GW, the RNC may support a large number of HNBs to simultaneously establish logical connection relationships with the RNC; therefore, the soft handover between an RNC cell and an HNB cell is neither limited by the number of Iur connections of the RNC, nor affected by location changes of the HNBs. In addition, because the HNB-GW establishes a physical connection with the RNC, the number and location changes of the HNBs have no effect on the maintenance cost or signaling load, so that the network works in a low-load, easy-to-plan, and easy-to-maintain state. Furthermore, the HNB-GW only acts as a proxy of the RNSAP protocol stack, and does not need to include the RNSAP protocol stack, so that the HNB-GW does not conflict with the architecture stipulated by the protocol, which helps evolution towards the protocol and results in a lower implementation cost.

The foregoing embodiment describes the process of a soft handover method according to the present invention from the perspective of the HNB-GW; the following embodiment describes the soft handover method according to the present invention from the perspective of an HNB.

Figure 3:
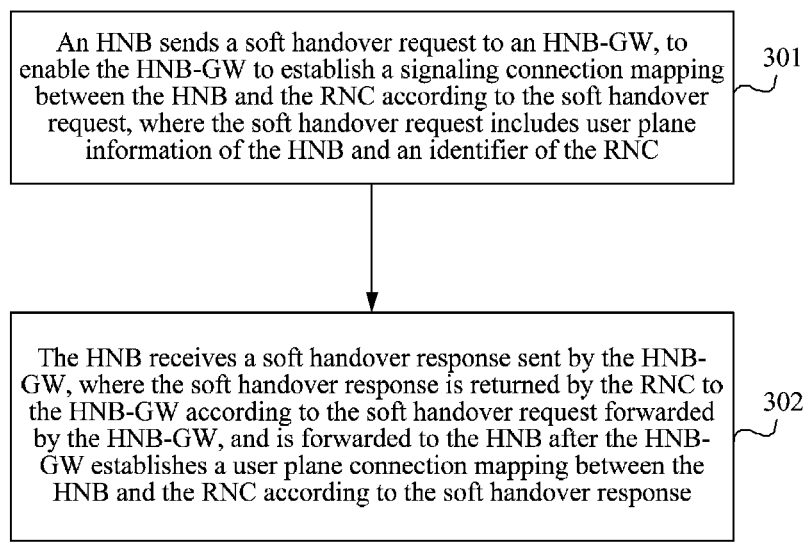
FIG. 3 is a flowchart of a soft handover method performed by an HNB and an RNC according to another embodiment of the present invention.

FIG. 3 is a flowchart of a soft handover method performed by an HNB and an RNC according to another embodiment of the present invention. As shown in FIG. 3, the soft handover method according to the embodiment includes the following steps:

Step 301: An HNB sends a soft handover request to an HNB-GW, to enable the HNB-GW to establish a signaling connection mapping between the HNB and the RNC according to the soft handover request, where the soft handover request includes user plane information of the HNB and an identifier of the RNC.

In the embodiment, the HNB implements a complete RNSAP protocol stack, provides logical Iur interfaces, and performs necessary signaling and resource processing such as measurement initiating and radio resource management.

The HNB makes a soft handover decision according to information such as measured signal strength, and initiates a soft handover request to the RNC through the HNB-GW when a soft handover requirement is met. Therefore, when the soft handover requirement is met, the HNB sends a soft handover request to the HNB-GW, where the soft handover request carries user plane information of the HNB and an identifier of the RNC of handover destination.

The user plane information of the HNB mainly includes a user plane IP address and a UDP port number, which is not limited here. The identifier of the RNC may be obtained from a signal measured by the HNB.

After receiving the soft handover request, the HNB-GW obtains, from the soft handover request, the user plane information of the HNB and the identifier of the RNC, records the user plane information of the HNB, and simultaneously identifies and addresses the RNC according to the identifier of the RNC. The HNB-GW identifies, according to the identifier of the RNC, that the HNB needs assistance to perform the soft handover, and therefore binds an identifier of the HNB with the identifier of the RNC, so as to establish a signaling connection mapping between the HNB and the RNC. The HNB further allocates forwarding connection resource information used for establishing a connection with the RNC, and forwards the soft handover request to the RNC based on the allocated forwarding connection resource information. For the forwarding connection resource information, reference may be made to step 202.

After the HNB-GW forwards the soft handover request to the RNC, the RNC performs operations such as resource allocation to prepare for the soft handover, and returns a soft handover response to the HNB-GW, where the soft handover response carries connection resource information of the RNC.

The HNB-GW receives the soft handover response sent by the RNC, obtains, from the soft handover response, the connection resource information of the RNC, and records the connection resource information of the RNC.

The HNB-GW further allocates, to the HNB, forwarding user plane information, which is used for establishing a connection with the HNB during the soft handover process. The forwarding user plane information includes information pointing to the HNB-GW. The forwarding user plane information mainly includes a user plane IP address and a UDP port number that point to the HNB-GW. The HNB-GW may allocate the forwarding user plane information to the HNB when receiving the soft handover request from the HNB or allocate the forwarding user plane information to the HNB when receiving the soft handover response.

To ensure that user plane data between the HNB and the RNC can be mutually forwarded, the HNB-GW binds the user plane information of the HNB, the forwarding user plane information, the forwarding connection resource information, and the connection resource information of the RNC, so as to establish a user plane connection mapping between the HNB and the RNC. The user plane information of the HNB corresponds to the forwarding user plane information, the forwarding user plane information corresponds to the forwarding connection resource information, and the forwarding connection resource information corresponds to the connection resource information of the RNC, and therefore the user plane connection mapping is established between the HNB and the RNC, to ensure that user plane data between the HNB and the RNC is mutually forwarded through the HNB-GW.

Then, the HNB-GW replaces the connection resource information of the RNC in the soft handover response with the forwarding user plane information, and sends the soft handover response to the HNB.

Step 302: The HNB receives a soft handover response sent by the HNB-GW, where the soft handover response is returned by the RNC to the HNB-GW according to the soft handover request forwarded by the HNB-GW, and is forwarded to the HNB after the HNB-GW establishes a user plane connection mapping between the HNB and the RNC according to the soft handover response, and the soft handover response includes forwarding user plane information allocated by the HNB-GW to the HNB.

The process of receiving the soft handover response by the HNB includes: forwarding, by the HNB-GW, the soft handover request to the RNC, and returning, by the RNC, the soft handover response to the HNB-GW according to the soft handover request; establishing, by the HNB-GW, a user plane connection mapping between the HNB and the RNC according to the soft handover response, and sending the soft handover response to the HNB; receiving, by the HNB, the soft handover response forwarded by the HNB-GW. At this moment, the HNB-GW establishes the signaling connection mapping and the user plane connection mapping between the HNB and the RNC, so that signaling and user plane data between the HNB and the RNC may be successfully forwarded, thereby implementing the soft handover between the HNB and the RNC.

In the embodiment, the HNB establishes a signaling connection with the RNC through the HNB-GW, the HNB establishes a logical connection with the RNC, and the HNB-GW establishes a physical connection with the RNC, so that signaling and user plane data exchange between the HNB and the RNC is completed through the HNB-GW, thereby implementing the soft handover process, resolving the soft handover problem when a macro cell is adjacent to an HNB cell, and improving user experience. Moreover, due to proxy of the HNB-GW, the RNC may support a large number of HNBs to simultaneously establish logical connection relationships with the RNC; therefore, the soft handover between an RNC cell and an HNB cell is neither limited by the number of Iur connections of the RNC, nor affected by location changes of the HNBs. In addition, because the HNB-GW establishes a physical connection with the RNC, the number and location changes of the HNB have no effect on the maintenance cost or signaling load, so that the network works in a low-load, easy-to-plan, and easy-to-maintain state. Furthermore, the HNB-GW only acts as a proxy of the RNSAP protocol stack, and does not need to include the RNSAP protocol stack, so that the HNB-GW does not conflict with the architecture stipulated by the protocol, which helps evolution towards the protocol and results in a lower implementation cost.

In each of the foregoing embodiments, before the HNB sends a soft handover request to the HNB-GW, the HNB-GW establishes a signaling connection with the RNC by configuring a physical Iur interface. In addition, before the HNB sends a soft handover request to the HNB-GW, the HNB sends a registration request to the HNB-GW to register with the HNB-GW, and the HNB-GW determines and saves an identifier of the HNB according to the registration request. The HNB-GW may obtain a name (HNB id) from the registration request, and use the name of the HNB as the identifier of the HNB. The HNB-GW may further allocate an SCTP coupling number to the HNB according to the received registration request, and use the allocated SCTP coupling number as the identifier of the HNB.

Further, in each of the foregoing embodiments, after the HNB receives the soft handover response forwarded by the HNB-GW, any one or more of the following operations may be included:

The HNB sends a signaling message to the HNB-GW; the HNB-GW forwards the signaling message to the RNC according to the signaling connection mapping between the HNB and the RNC. Specifically, the HNB may send a signaling message to the HNB-GW through an SCTP connection with the HNB-GW; the HNB-GW finds the RNC according to the signaling connection mapping between the HNB and the RNC, and forwards the signaling message to the RNC through an SCCP connection with the RNC.

The HNB sends downlink data to the HNB-GW according to the forwarding user plane information; the HNB-GW forwards the downlink data to the RNC according to the user plane connection mapping between the HNB and the RNC based on the forwarding connection resource information pointing to the HNB-GW and allocated to the RNC.

The RNC sends uplink data to the HNB-GW based on the forwarding connection resource information; the HNB-GW forwards the uplink data to the HNB according to the user plane connection mapping between the HNB and the RNC based on the forwarding user plane information pointing to the HNB-GW and allocated to the HNB; and the HNB receives the uplink data sent by the RNC and forwarded by the HNB-GW.

Further, after the service ends, the HNB sends a soft handover ending request to the HNB-GW; the HNB-GW forwards the soft handover ending request to the RNC according to the signaling connection mapping between the HNB and the RNC, receives a soft handover ending response sent by the RNC, and forwards the soft handover ending response to the HNB according to the signaling connection mapping between the HNB and the RNC. Then, the HNB-GW deletes the signaling connection mapping between the HNB and the RNC and the user plane connection mapping between the HNB and the RNC, and releases the forwarding user plane information and the forwarding connection resource information. The RNC and the HNB also release resources.

Figure 4A:
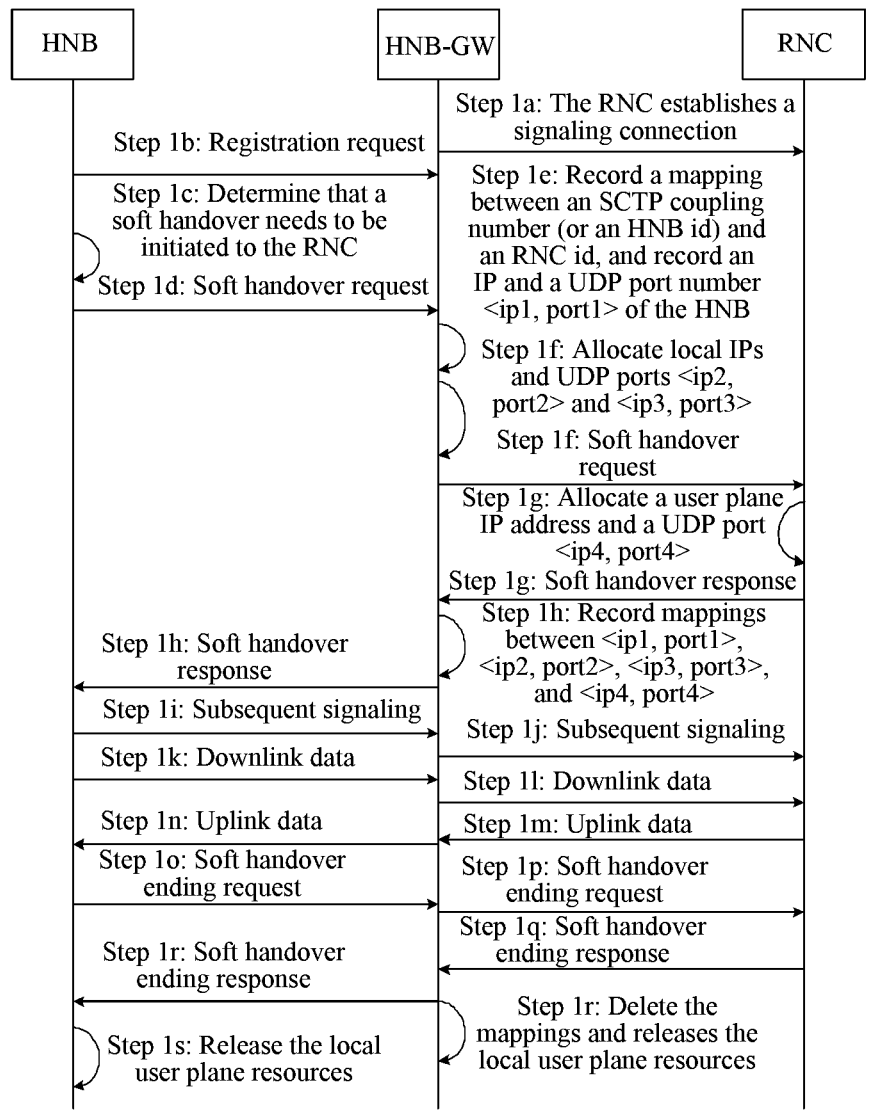
FIG. 4A is a flowchart of a soft handover method performed by an HNB and an RNC when a link medium between the RNC and an HNB-GW is IP over Ethernet according to an embodiment of the present invention.

FIG. 4A is a flowchart of a soft handover method performed by an HNB and an RNC when a link medium between the RNC and an HNB-GW is IP over Ethernet according to an embodiment of the present invention. As shown in FIG. 4A, the method according to the embodiment includes the following steps:

Step 1*a*: Configure, to an RNC on an HNB-GW, a signal connection control part (Signal Connection Control Part, SCCP) destination signaling point, to establish a signaling connection with the RNC.

Step 1*b*: An HNB sends a registration request to the HNB-GW, to register with the HNB-GW.

The registration request according to the embodiment includes: a name of the HNB (that is an HNB id well-known in the art). After the HNB registers with the HNB-GW, the HNB-GW obtains the HNB id from the registration request, and uses the HNB id as an identifier of the HNB. Alternatively, after the HNB registers with the HNB-GW, the HNB-GW allocates an SCTP coupling number to the HNB, and uses the allocated SCTP coupling number to uniquely identify the HNB.

Step 1*c*: When a UE moves from cell coverage of the HNB to cell coverage of a NodeB under the RNC, the HNB determines that a soft handover needs to be initiated to the RNC.

Step 1*d*: The HNB sends a soft handover request (such as RL setup req) to the HNB-GW.

The soft handover request carries a user plane IP address and a UDP port number of the HNB, which are recorded as <ip1, port1>, and an RNC id.

Step 1*e*: When receiving the soft handover request, the HNB-GW records a mapping between an SCTP coupling number (or the HNB id) and the RNC id, that is, a signaling connection mapping between the RNC and the HNB, and simultaneously records the user plane IP address and the UDP port number <ip1, port1> of the HNB.

Step 1*f*: The HNB-GW allocates local IP and UDP ports <ip2, port2> and <ip3, port3>, to be used for establishing user plane connections with the HNB and the RNC respectively, replaces <ip1, port1> in the soft handover request with <ip3, port3>, deletes the RNC id from the soft handover request, and forwards the soft handover request to the RNC.

Step 1*g*: After receiving the soft handover request sent by the HNB-GW, the RNC allocates a user plane IP address and a UDP port <ip4, port4> to prepare for the soft handover, and returns a soft handover response (such as RL setup rsp) to the HNB-GW, where the soft handover response carries <ip4, port4>.

Step 1h: After receiving the soft handover response, the HNB-GW records mappings between <ip1, port1>, <ip2, port2>, <ip3, port3>, and <ip4, port4>, that is, user plane connection mappings between the RNC, the HNB-GW, and the HNB, replaces the user plane information <ip4, port4> of the RNC in the soft handover response with <ip2, port2>, and forwards the soft handover response to the HNB.

<ip1, port1> corresponds to <ip2, port2>, <ip2, port2> corresponds to <ip3, port3>, <ip3, port3> corresponds to <ip4, port4>, and <ip1, port1> may correspond to <ip4, port4> through <ip2, port2> and <ip3, port3>.

Step 1i: The HNB continues to send subsequent signaling to the HNB-GW.

The HNB may send subsequent signaling to the HNB-GW through an SCTP connection with the HNB-GW.

Step 1j: The HNB-GW forwards the subsequent signaling to the RNC according to the signaling connection mapping between the RNC and the HNB, to ensure forwarding of signaling messages between the HNB and the RNC.

The HNB-GW identifies the RNC according to the signaling connection mapping between the RNC and the HNB, and forwards, through an SCCP connection with the RNC, to the RNC the subsequent signaling sent by the HNB.

The subsequent signaling includes downlink synchronization (DL Sync) and uplink synchronization (UL Sync).

Step 1k: When forwarding downlink data to the RNC, the HNB uses <ip1, port1> and <ip2, port2> carried in the previous soft handover response to encapsulate the downlink data, and sends the downlink data to the HNB-GW.

The downlink data has a source IP address being ip1, a source port number being port1, a destination IP address being ip2, and a destination port number being port2.

Step 1l: After receiving the downlink data, the HNB-GW replaces <ip1, port1> and <ip2, port2> in the received downlink data with <ip3, port3> and <ip4, port4> respectively according to the user plane connection mappings between the RNC, the HNB-GW, and the HNB, and sends the downlink data to the RNC.

Specifically, <ip3, port3> corresponding to <ip1, port1> may be found according to the mappings between <ip1, port1> and <ip2, port2>, and between <ip2, port2> and <ip3, port3>; <ip4, port4> corresponding to <ip2, port2> may be found according to the mappings between <ip2, port2> and <ip3, port3>, and between <ip3, port3> and <ip4, port4>; the downlink data is re-encapsulated by using the found <ip3, port3> and <ip4, port4> before being sent to the RNC.

After replacement (or re-encapsulation), the source IP address of the downlink data changes to ip3, the source port number changes to port3, the destination IP address changes to ip4, and the destination port number changes to port4.

Step 1m: When forwarding uplink data to the HNB, the RNC uses <ip4, port4> and <ip3, port3> that is carried in the previous soft handover request to encapsulate the uplink data, and sends the uplink data to the HNB-GW.

The uplink data has a source IP address being ip4, a source port number being port4, a destination IP address being ip3, and a destination port number being port3.

Step 1n: After receiving the uplink data, the HNB-GW replaces <ip4, port4> and <ip3, port3> in the received uplink data with <ip2, port2> and <ip1, port1> respectively according to the user plane connection mappings between the RNC, the HNB-GW, and the HNB, and sends the uplink data to the HNB.

Specifically, <ip1, port1> corresponding to <ip3, port3> may be found according to the mappings between <ip1, port1> and <ip2, port2>, and between <ip2, port2> and <ip3, port3>; <ip2, port2> corresponding to <ip4, port4> may be found according to the mappings between <ip2, port2> and <ip3, port3>, and between <ip3, port3> and <ip4, port4>; the uplink data is re-encapsulated by using the found <ip1, port1> and <ip2, port2> before being sent to the HNB.

After replacement (or re-encapsulation), the source IP address of the uplink data changes to ip2, the source port number changes to port2, the destination IP address changes to ip1, and the destination port number changes to port1.

The HNB-GW ensures that user plane data between the RNC and the HNB is forwarded.

Step 1o: After the service ends, the HNB sends a soft handover ending request (such as RL deletion req) to the HNB-GW.

Step 1p: The HNB-GW forwards the soft handover ending request to the RNC according to the signaling connection mapping between the RNC and the HNB.

Step 1q: After receiving the soft handover ending request, the RNC releases local resources, and returns a soft handover ending response (such as RL delete rsp) to the HNB-GW.

Step 1r: The HNB-GW forwards the soft handover ending response to the HNB according to the signaling connection mapping between the RNC and the HNB; after forwarding the soft handover ending response to the HNB, deletes the local signaling connection mapping between the RNC and the HNB and user plane connection mappings between the RNC, the HNB-GW, and the HNB, and releases local user plane resources.

Step 1s: The HNB receives the soft handover ending response, and releases local user plane resources, and the soft handover process ends.

In the embodiment, the HNB-GW establishes a signaling connection with the RNC, so that the HNB only needs to establish a logical connection with the RNC, and exchanges signaling and user plane data with the RNC through the HNB-GW, thereby implementing the soft handover between a macro cell and an HNB cell.

Figure 4B:
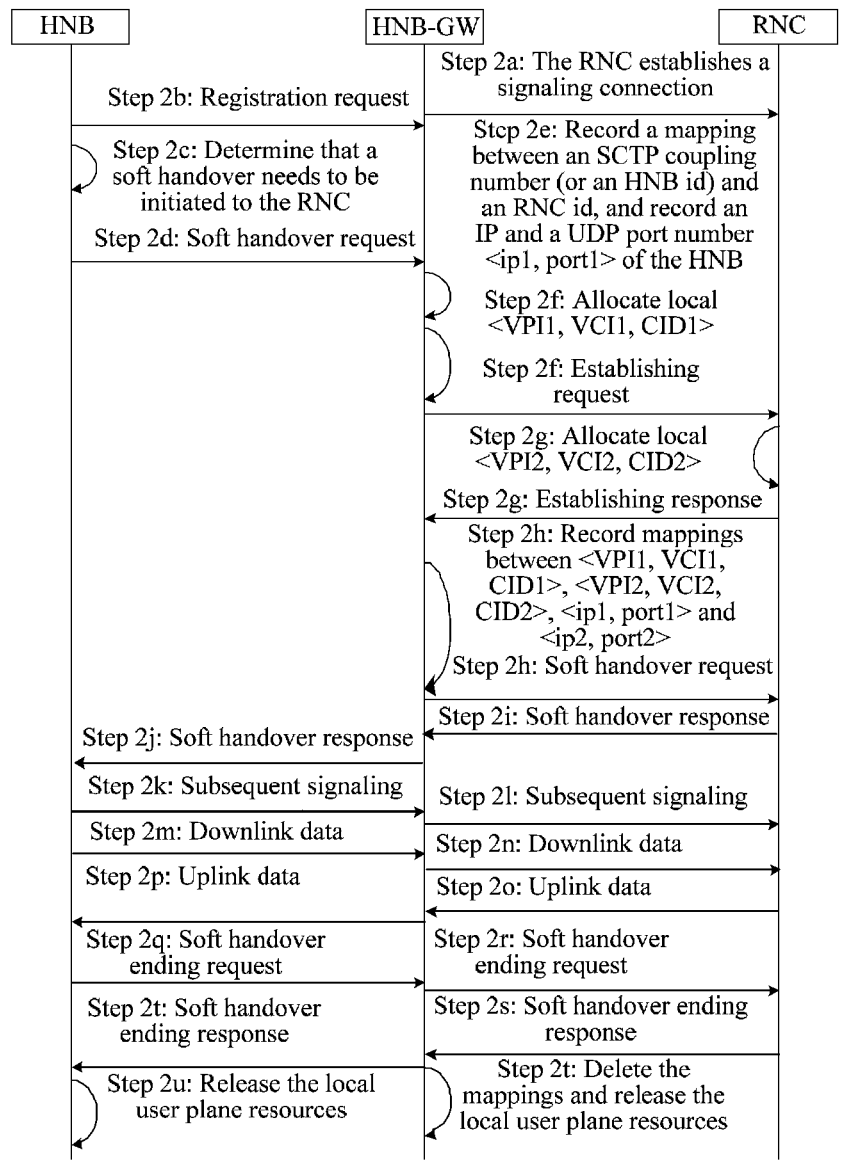
FIG. 4B is a flowchart of a soft handover method performed by an HNB and an RNC when a link medium between the RNC and an HNB-GW is the ATM according to an embodiment of the present invention.

FIG. 4B is a flowchart of a soft handover method performed by an HNB and an RNC when a link medium between the RNC and an HNB-GW is ATM according to an embodiment of the present invention. As shown in FIG. 4B, the method according to the embodiment includes the following steps:

Step 2a: Configure, on an HNB-GW, an SCCP destination signaling point to an RNC, so as to establish a signaling connection with the RNC.

Step 2b: An HNB sends a registration request to the HNB-GW, to register with the HNB-GW.

After the HNB registers with the HNB-GW, the HNB-GW uniquely identifies the HNB through an SCTP coupling number or an HNB id.

Step 2c: When a UE moves from cell coverage of the HNB to cell coverage of a NodeB under the RNC, the HNB determines that a soft handover needs to be initiated to the RNC.

Step 2d: The HNB sends a soft handover request (such as RL setup req) to the HNB-GW.

The soft handover request carries a user plane IP address and a UDP port number of the HNB, which are recorded as <ip1, port1>, and an RNC id.

Step 2e: When receiving the soft handover request, the HNB-GW records a mapping between an SCTP coupling number (or the HNB id) and the RNC id, that is, a signaling connection mapping between the RNC and the HNB, and simultaneously records the user plane IP address and the UDP port number <ip1, port1> of the HNB.

Step 2f: The HNB-GW determines that the type of an Iur interface is ATM, identifies that an AAL2 link needs to be established with the RNC; therefore allocates a local AAL2 resource <VPI1, VCI1, CID1>, and sends an establishing request (Est req) to the RNC.

Step 2g: After receiving the establishing request sent by the HNB-GW, the RNC allocates a local AAL2 resource <VPI2, VCI2, CID2>, and returns an establishing confirmation (Est conf) to the HNB-GW, where the establishing confirmation carries <VPI2, VCI2, CID2>.

Step 2h: After receiving the establishing confirmation, the HNB-GW records mappings between <VPI1, VCI1, CID1>, <VPI2, VCI2, CID2>, <ip1, port1> and <ip2, port2>, that is, user plane connection mappings between the RNC, the HNB-GW, and the HNB, allocates a local IP address and UDP port <ip2, port2> to the HNB, so as to establish a user plane connection with the HNB, then replaces the user plane information <ip1, port1> of the HNB in the soft handover request with <VPI1, VCI1, CID1>, deletes the RNC id in the soft handover request, and then forwards the soft handover request to the RNC.

<VPI1, VCI1, CID1> corresponds to <VPI2, VCI2, CID2>, <ip1, port1> corresponds to <ip2, port2>, <VPI1, VCI1, CID1> corresponds to <ip2, port2>, and <VPI2, VCI2, CID2> may correspond to <ip1, port1> through the mapping between <VPI1, VCI1, CID1> and <ip2, port2>.

Step 2i: After receiving the soft handover request sent by the HNB-GW, the RNC prepares for the soft handover, and returns a soft handover response (such as RL setup rsp) to the HNB-GW.

Step 2j: After receiving the soft handover response, the HNB-GW replaces the user plane information <VPI1, VCI1, CID1> of the RNC in the soft handover response with <ip2, port2>, and forwards the soft handover response to the HNB.

Step 2k: The HNB continues to send subsequent signaling to the HNB-GW.

The HNB may send subsequent signaling to the HNB-GW through an SCTP connection with the HNB-GW Step 2l: The HNB-GW forwards the subsequent signaling to the RNC according to the signaling connection mapping between the RNC and the HNB, to ensure forwarding of signaling messages between the HNB and the RNC.

The HNB-GW identifies the RNC according to the signaling connection mapping between the RNC and the HNB, and forwards, through an SCCP connection with the RNC, to the RNC the subsequent signaling sent by the HNB.

The subsequent signaling includes downlink synchronization (DL Sync) and uplink synchronization (UL Sync).

Step 2m: When forwarding downlink data to the RNC, the HNB uses <ip1, port1> and <ip2, port2> that is carried in the previous soft handover response to encapsulate the downlink data, and sends the downlink data to the HNB-GW.

The downlink data has a source IP address being ip1, a source port number being port1, a destination IP address being ip2, and a destination port number being port2.

Step 2n: After receiving the downlink data, the HNB-GW replaces <ip1, port1> and <ip2, port2> in the received downlink data with <VPI1, VCI1, CID1> and <VPI2, VCI2, CID2> respectively according to the user plane connection mappings between the RNC, the HNB-GW, and the HNB, and sends the downlink data to the RNC.

Specifically, <VPI1, VCI1, CID1> corresponding to <ip1, port1> is found according to the mappings between <ip1, port1> and <ip2, port2>, and between <VPI1, VCI1, CID1> and <ip2, port2>; <VPI2, VCI2, CID2> corresponding to <ip2, port2> is found according to the mappings between <VPI1, VCI1, CID1> and <VPI2, VCI2, CID2>, and between <VPI1, VCI1, CID1> and <ip2, port2>; the downlink data is re-encapsulated by using the found <VPI1, VCI1, CID1> and <VPI2, VCI2, CID2> before being sent to the RNC. Step 2o: When forwarding uplink data to the HNB, the RNC uses <VPI2+VCI2+CID2> and <VPI1, VCI1, CID1> that is carried in the previous soft handover request to encapsulate the uplink data, and sends the uplink data to the HNB-GW.

Step 2p: After receiving the uplink data, the HNB-GW replaces <VPI2, VCI2, CID2> and <VPI1, VCI1, CID1> in the received uplink data with <ip2, port2> and <ip1, port1> respectively according to the user plane connection mappings between the RNC, the HNB-GW, and the HNB, and sends the uplink data to the RNC.

Specifically, <ip1, port1> corresponding to <VPI1, VCI1, CID1> is found according to the mappings between <ip1, port1> and <ip2, port2>, and between <VPI1, VCI1, CID1> and <ip2, port2>; <ip2, port2> corresponding to <VPI2, VCI2, CID2> is found according to the mappings between <VPI1, VCI1, CID1> and <VPI2, VCI2, CID2>, and between <VPI1, VCI1, CID1> and <ip2, port2>; the downlink data is re-encapsulated by using the found <ip1, port1> and <ip2, port2> before being sent to the RNC.

After replacement (or re-encapsulation), the source IP address of the uplink data changes to ip2, the source port number changes to port2, the destination IP address changes to ip1, and the destination port number changes to port1.

The HNB-GW ensures forwarding of user plane data between the RNC and the HNB.

Step 2q: After the service stops, the HNB sends a soft handover ending request (such as RL deletion req) to the HNB-GW.

Step 2r: The HNB-GW forwards the soft handover ending request to the RNC according to the signaling connection mapping between the RNC and the HNB.

Step 2s: After receiving the soft handover ending request, the RNC releases local resources, and returns a soft handover ending response (such as RL delete rsp) to the HNB-GW.

Step 2t: The HNB-GW forwards the soft handover ending response to the HNB according to the signaling connection mapping between the RNC and the HNB; after forwarding the soft handover ending response to the HNB, deletes the local signaling connection mapping between the RNC and the HNB and user plane connection mappings between the RNC, the HNB-GW, and the HNB, and releases local user plane resources.

Step 2u: The HNB receives the soft handover ending response, and releases local user plane resources, and the soft handover process ends.

Compared with the embodiment shown in FIG. 4A, the difference of the embodiment lies in that, the link medium between the RNC and the HNB-GW is ATM, and the bearer of the Iur interface between the HNB-GW and the RNC is ATM, and according to the protocol, the AAL2 resource needs to be allocated; therefore, during the soft handover process, a process of establishing and releasing the AAL2 link is added.

In the embodiment, the HNB-GW establishes a signaling connection with the RNC, so that the HNB only needs to establish a logical connection with the RNC, and exchange signaling and user plane data with the RNC through the HNB-GW, thereby implementing the soft handover between a macro cell and an HNB cell.

Figure 5A:
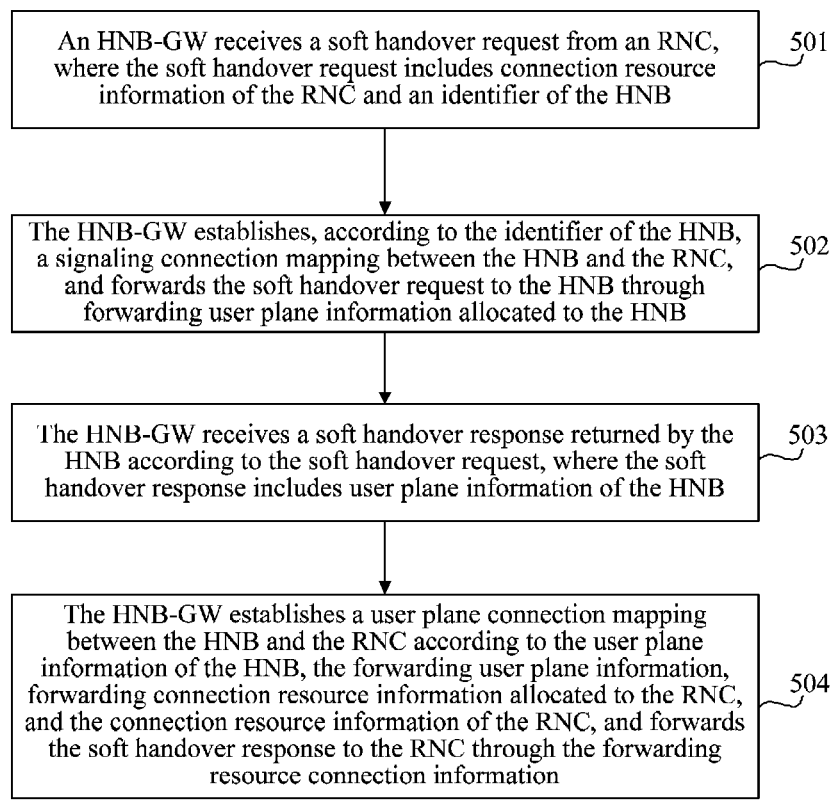
FIG. 5A is a flowchart of a soft handover method performed by an HNB and an RNC according to another embodiment of the present invention.

FIG. 5A is a flowchart of a soft handover method performed by an HNB and an RNC according to another embodiment of the present invention. As shown in FIG. 5A, the method according to the embodiment includes the following steps:

Step 501: An HNB-GW receives a soft handover request sent by an RNC, where the soft handover request includes connection resource information of the RNC and an identifier of an HNB.

In the embodiment, the RNC implements a complete RNSAP protocol stack, supports Iur interfaces, and performs necessary signaling and resource processing such as measurement initiating and radio resource management.

The RNC makes a soft handover decision according to information such as measured signal strength, and initiates a soft handover request to the HNB through the HNB-GW when a soft handover requirement is met. Therefore, when the soft handover requirement is met, the RNC sends a soft handover request to the HNB-GW, where the soft handover request carries connection resource information of the RNC and an identifier of the HNB of handover destination.

The connection resource information of the RNC varies according to different link media between the HNB-GW and the RNC. For example, if the link medium between the HNB-GW and the RNC is IP over Ethernet, the connection resource information of the RNC mainly includes a user plane IP address and a UDP port number. If the link medium between the HNB-GW and the RNC is ATM, the connection resource information of the RNC mainly includes a channel identifier, such as a VPI, a VCI, and a CID, which is needed for establishing an AAL2 link.

The identifier of the HNB may be a name of the HNB (that is HNB id) or scrambling code information of the HNB, or other information that is predetermined by the HNB and the RNC and may be used by the RNC to uniquely identify the HNB. The identifier of the HNB may be obtained from a signal measured by the RNC. For example, when the identifier of the HNB is the scrambling code information of the HNB or the HNB id, the RNC may obtain, from a measured handover message, the scrambling code information of the HNB or the HNB id. For a single RNC, the scrambling code information of the HNB or the HNB id may uniquely identify an HNB.

Step 502: The HNB-GW establishes, according to the identifier of the HNB, a signaling connection mapping between the RNC and the HNB, and forwards the soft handover request to the HNB based on forwarding user plane information allocated to the HNB.

In the embodiment, the HNB-GW establishes a signaling connection with the RNC by configuring a physical Iur interface.

After receiving the soft handover request sent by the RNC, the HNB-GW obtains, from the soft handover request, the identifier of the HNB and the connection resource information of the RNC, records the connection resource information of the RNC, and simultaneously identifies and addresses the HNB according to the identifier of the HNB.

Identifiers of HNBs are stored in advance on the HNB-GW, and the HNB-GW may uniquely locate an HNB and relevant information (such as an HNB id or an SCTP coupling number) of the HNB according to the identifier of the HNB. Generally, during communication, the HNB-GW identifies an HNB according to the stored HNB ids or SCTP coupling numbers, while the HNB ids or SCTP coupling numbers are generally determined by the HNB-GW according to registration requests sent by the HNBs. The HNB-GW identifies, according to the identifier of the HNB, that the RNC needs assistance for the soft handover, thereby establishing a signaling connection mapping between the HNB and the RNC. When establishing a signaling connection with the RNC, the HNB-GW saves an SCCP signaling point related to the RNC, where the SCCP signaling point may uniquely identify the RNC; therefore, the HNB-GW may bind the identifier of the HNB with the SCCP signaling point corresponding to the RNC, to establish the signaling connection mapping between the HNB and the RNC.

The HNB-GW further allocates the forwarding user plane information to the HNB, which is used for establishing a connection with the HNB during the soft handover process. The forwarding user plane information includes information pointing to the HNB-GW, and mainly includes a user plane IP address and a UDP port number that are allocated by the HNB-GW to the HNB. Then, the HNB-GW replaces the connection resource information of the RNC in the soft handover request with the forwarding user plane information, and forwards the soft handover request to the HNB.

Step 503: The HNB-GW receives a soft handover response returned by the HNB according to the soft handover request, where the soft handover response includes user plane information of the HNB.

After the HNB-GW forwards the soft handover request to the HNB, the HNB performs resource allocation to prepare for the soft handover, and returns a soft handover response to the HNB-GW, where the soft handover response carries the user plane information of the HNB. The user plane information of the HNB mainly includes the user plane IP address and the UDP port number.

The HNB-GW receives the soft handover response sent by the HNB, obtains, from the soft handover response, the user plane information of the HNB, and records the user plane information of the HNB.

Step 504: The HNB-GW establishes a user plane connection mapping between the HNB and the RNC according to the user plane information of the HNB, the forwarding user plane information, forwarding connection resource information allocated to the RNC, and the connection resource information of the RNC, and forwards the soft handover response to the RNC based on the forwarding connection resource information.

In the embodiment, the HNB-GW further allocates, to the RNC, the forwarding connection resource information, which is used for establishing a connection with the RNC during the soft handover process.

The forwarding connection resource information includes information pointing to the HNB-GW. The forwarding connection resource information varies according to different link media between the HNB-GW and the RNC. For example, if the link medium between the HNB-GW and the RNC is IP over Ethernet, the forwarding connection resource information mainly includes a user plane IP address and a UDP port number that point to the HNB-GW and are allocated by the HNB-GW to the RNC. If the link medium between the HNB-GW and the RNC is ATM, the forwarding connection resource information mainly includes a channel identifier, such as a VPI, a VCI, and a CID, which is needed for establishing an AAL2 link, allocated by the HNB-GW to the RNC and points to the HNB-GW.

To ensure that user plane data between the HNB and the RNC can be mutually forwarded, the HNB-GW binds the user plane information of the HNB, the forwarding user plane information, the forwarding connection resource information, and the connection resource information of the RNC, so as to establish a user plane connection mapping between the HNB and the RNC.

Then, the HNB-GW replaces the user plane information of the HNB in the soft handover response with the connection resource information of the RNC, and sends the soft handover response to the RNC.

At this moment, the HNB-GW establishes the signaling connection mapping and the user plane connection mapping between the HNB and the RNC, so that signaling and user plane data between the HNB and the RNC may be successfully forwarded, thereby implementing the soft handover between the HNB and the RNC.

In the embodiment, the HNB-GW implements RNSAP protocol stack proxy, establishes a signaling connection with the RNC, and provides a physical Iur interface, to enable the HNB to establish a logical connection with the RNC; signaling and user plane data exchange between the HNB and the RNC is completed through the HNB-GW, thereby implementing the soft handover process, resolving the soft handover problem when a macro cell is adjacent to an HNB cell, and improving user experience. Moreover, due to proxy of the HNB-GW, the RNC may support a large number of HNBs to simultaneously establish logical connection relationships with the RNC; therefore, the soft handover between an RNC cell and an HNB cell is neither limited by the number of Iur connections of the RNC, nor affected by location changes of the HNBs. In addition, because the HNB-GW establishes a physical connection with the RNC, the number and location changes of the HNBs have no effect on the maintenance cost and signaling load, so that the network works in a low-load, easy-to-plan, and easy-to-maintain state. Furthermore, the HNB-GW only acts as a proxy of the RNSAP protocol stack, and does not need to include the RNSAP protocol stack, so that the HNB-GW does not conflict with the architecture stipulated by the protocol, which helps evolution towards the protocol and results in a lower implementation cost.

The foregoing embodiment describes the process of a soft handover method according to the present invention from the perspective of the HNB-GW; the following embodiment describes the soft handover method according to the present invention from the perspective of the RNC.

Figure 5B:
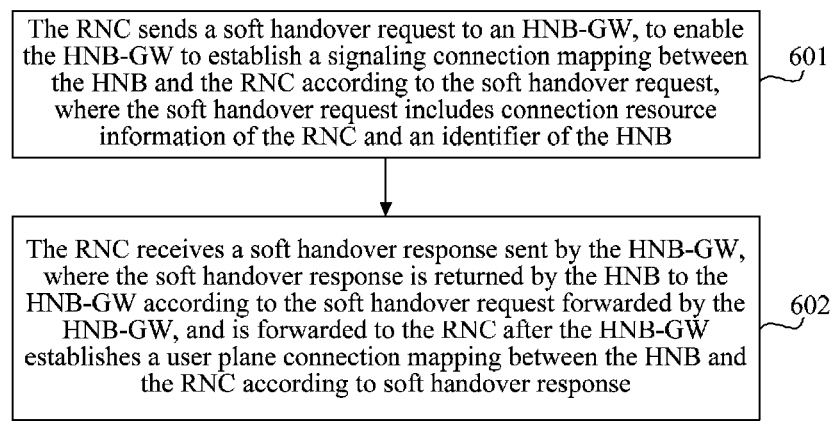
FIG. 5B is a flowchart of a soft handover method performed by an HNB and an RNC according to still another embodiment of the present invention.

FIG. 5B is a flowchart of a soft handover method performed by an HNB and an RNC according to another embodiment of the present invention. As shown in FIG. 5B, the method according to the embodiment includes the following steps:

Step 601: An RNC sends a soft handover request to an HNB-GW, to enable the HNB-GW to establish a signaling connection mapping between an HNB and the RNC according to the soft handover request, where the soft handover request includes connection resource information of the RNC and an identifier of the HNB.

In the embodiment, the RNC makes a soft handover decision according to information such as measured signal strength, and initiates a soft handover request to the HNB through the HNB-GW when a soft handover requirement is met, where the soft handover request carries connection resource information of the RNC and an identifier of the HNB of handover destination.

For the connection resource information of the RNC and the identifier of the HNB, reference may be made to step 501.

For the process of establishing, by the HNB-GW, a signaling connection mapping between the HNB and the RNC according to the soft handover request, reference may be made to step 502, which is not described in detail here again.

Step 602: The RNC receives a soft handover response sent by the HNB-GW, where the soft handover response is returned by the HNB to the HNB-GW according to the soft handover request forwarded by the HNB-GW, and is forwarded to the RNC after the HNB-GW establishes a user plane connection mapping between the HNB and the RNC according to soft handover response, and the soft handover response includes forwarding connection resource information allocated by the HNB-GW to the RNC.

For the processes in which the HNB-GW forwards a soft handover request to the HNB, the HNB returns a soft handover response to the HNB-GW, and the HNB-GW establishes a user plane connection mapping between the HNB and the RNC according to the soft handover response, and forwards the soft handover response to the RNC, reference may be made to step 502 to step 504, which are not described in detail here again.

The RNC receives the soft handover response forwarded by the HNB-GW. At this moment, the HNB-GW establishes the signaling connection mapping and the user plane connection mapping between the HNB and the RNC, so that signaling and user plane data between the HNB and the RNC may be successfully forwarded, thereby implementing the soft handover between the HNB and the RNC.

Further, the soft handover method described from the perspective of the HNB includes the following steps: the HNB receives the soft handover request forwarded, by the HNB-GW, according to the forwarding user plane information allocated to the HNB, where the soft handover request includes the identifier of the HNB, and the soft handover request is sent from the RNC to the HNB-GW, and forwarded after the HNB-GW establishes the signaling connection mapping between the RNC and the HNB according to the soft handover request. Then, the HNB sends the soft handover response to the HNB-GW according to the soft handover request, where the soft handover response includes the user plane information of the HNB, to enable the HNB-GW to establish the user plane connection mapping between the HNB and the RNC according to the soft handover response, and forward the soft handover response to the RNC.

For detailed descriptions about the foregoing operations, reference may be made to step 501 to step 504, which are not described in detail here again.

In the soft handover method according to the embodiment, the HNB-GW implements RNSAP protocol stack proxy, establishes a signaling connection with the RNC, and provides a physical Iur interface, to enable the HNB to establish a logical connection with the RNC; signaling and user plane data exchange between the HNB and the RNC is completed through the HNB-GW, thereby implementing the soft handover process, resolving the soft handover problem when a macro cell is adjacent to an HNB cell, and improving user experience. Moreover, due to proxy of the HNB-GW, the RNC may support a large number of HNBs to simultaneously establish logical connection relationships with the RNC; therefore, the soft handover between an HNB cell and an RNC cell is neither limited by the number of Iur connections of the RNC, nor affected by location changes of the HNBs. In addition, because the HNB-GW establishes a physical connection with the RNC, the number and location changes of the HNBs have no effect on the maintenance cost and signaling load, so that the network works in a low-load, easy-to-plan, and easy-to-maintain state. Furthermore, the HNB-GW only acts as a proxy of the RNSAP protocol stack, and does not need to include the RNSAP protocol stack, so that the HNB-GW does not conflict with the architecture stipulated by the protocol, which helps evolution towards the protocol.

In each of the foregoing embodiments, before the RNC sends a soft handover request to the HNB-GW, the HNB-GW establishes a signaling connection with the RNC by configuring a physical Iur interface. In addition, before the RNC sends a soft handover request to the HNB-GW, the HNB sends a registration request to the HNB-GW, to register with the HNB-GW. The HNB-GW determines and saves the identifier of the HNB according to the received registration of the HNB. For example, when the identifier of the HNB is an HNB id or scrambling code information of the HNB, the HNB encapsulates the HNB id or the scrambling code information of the HNB in a registration request and sends the registration request to the HNB-GW; the HNB-GW obtains the HNB id or the scrambling code information of the HNB from the registration request, and uses the HNB id or the scrambling code information of the HNB as the identifier of the HNB. In addition, after receiving the registration request, the HNB-GW further allocates an SCTP coupling number to the HNB.

In each of the foregoing embodiments, after the RNC receives a soft handover response forwarded by the HNB-GW, the method further includes any or more of the following operations:

The RNC may send a signaling message to the HNB-GW through an SCTP connection with the HNB-GW; the HNB-GW identifies the RNC according to the signaling connection mapping between the HNB and the RNC, and forwards the signaling message to the HNB through the SCCP connection with the RNC.

The RNC sends downlink data to the HNB-GW according to the forwarding connection resource information; the HNB-GW identifies the HNB according to the user plane connection mapping between the HNB and the RNC, and forwards the downlink data to the HNB based on the forwarding user plane information pointing to the HNB-GW and allocated to the HNB.

The HNB sends uplink data to the HNB-GW according to the forwarding user plane information; the HNB-GW identifies the RNC according to the user plane connection mapping between the HNB and the RNC, and forwards the uplink data to the RNC based on the forwarding connection resource information pointing to the HNB-GW and allocated to the RNC; the RNC receives the uplink data sent by the HNB and forwarded by the HNB-GW.

Further, after the service ends, the RNC sends a soft handover ending request to the HNB-GW; the HNB-GW forwards the soft handover ending request to the HNB according to the signaling connection mapping between the HNB and the RNC, receives a soft handover ending response sent by the NB, and forwards the soft handover ending response to the RNC according to the signaling connection mapping between the HNB and the RNC. After forwarding the soft handover ending response, the HNB-GW deletes the signaling connection mapping between the HNB and the RNC and the user plane connection mapping between the HNB and the RNC, and releases the forwarding user plane information and the forwarding connection resource information. The RNC and the HNB also release local resources.

Figure 6:
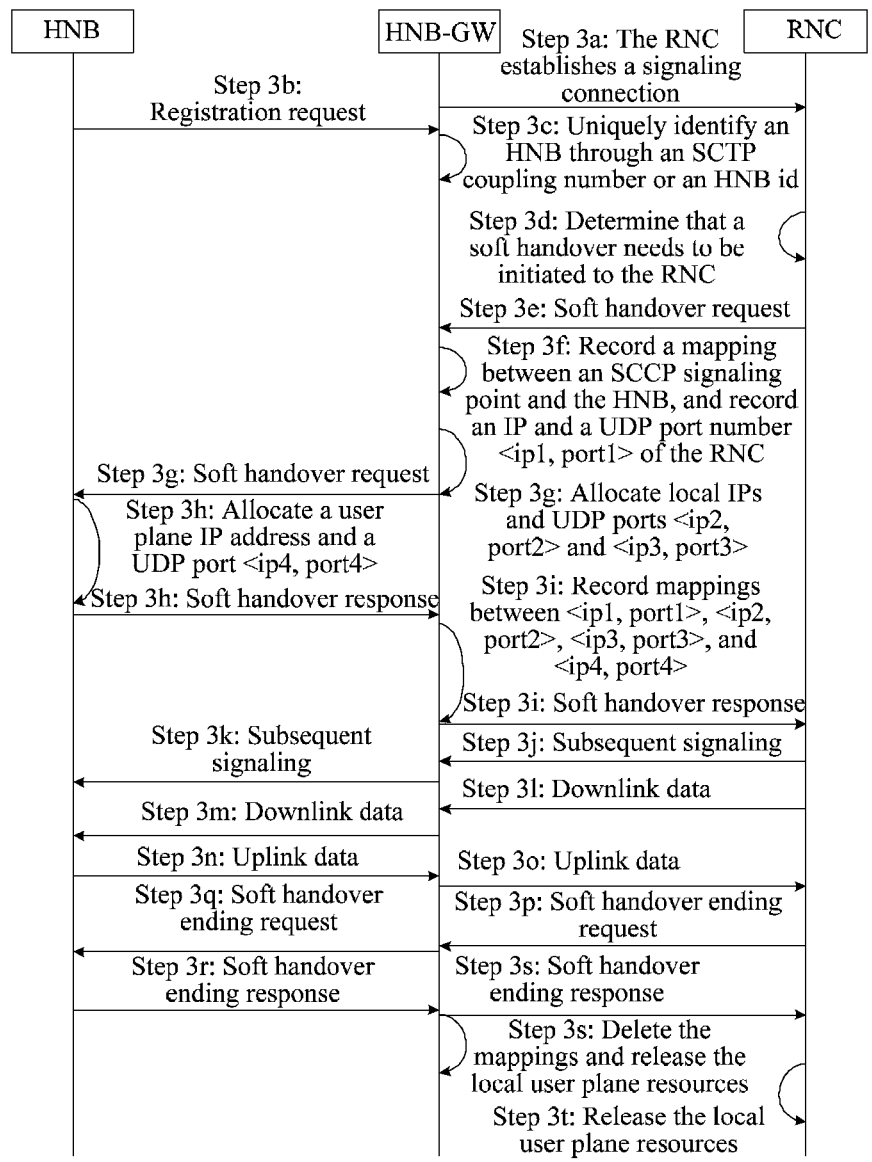
FIG. 6 is a flowchart of a soft handover method performed by an HNB and an RNC when a link medium between the RNC and an HNB-GW is IP over Ethernet according to another embodiment of the present invention.

FIG. 6 is a flowchart of a soft handover method performed by an HNB and an RNC when a link medium between the RNC and an HNB-GW is IP over Ethernet according to another embodiment of the present invention. As shown in FIG. 6, the method according to the embodiment includes the following steps:

Step 3a: Configure, on an HNB-GW, an SCCP destination signaling point to an RNC, so as to establish a signaling connection with the RNC.

Step 3b: An HNB sends a registration request to the HNB-GW, to register with the HNB-GW, where the registration request carries an identifier of the HNB.

If the identifiers of the HNBs carried in the registration requests are scrambling code information of the HNBs, the HNB-GW records the scrambling code information of each HNB. If the identifiers of the HNBs carried in the registration requests are the HNB ids, the HNB-GW records the HNB id of each HNB. In the embodiment, the identifier of the HNB is recorded as C-id.

Step 3c: After the HNB registers with the HNB-GW, the HNB-GW uniquely identifies the HNB through an SCTP coupling number or an HNB id.

After the HNB registers with the HNB-GW, the HNB-GW uniquely identifies the HNB by using the HNB id or the SCTP coupling number allocated to the HNB. In another word, for the HNB-GW, the SCTP coupling number may also uniquely identify the HNB.

Based on the foregoing description, the HNB-GW may further establish a mapping between the identifier of the HNB (such as the scrambling code information of the HNB or the HNB id) and the SCTP coupling number, and use the SCTP coupling number allocated to the HNB to uniquely identify the HNB; that is, C-id may further represent the SCTP coupling number.

Step 3d: When a UE moves from cell coverage of a NodeB to cell coverage of the HNB, the RNC determines that a soft handover needs to be initiated to the HNB.

Step 3e: The RNC sends a soft handover request (such as RL setup req) to the HNB-GW.

The soft handover request carries a user plane IP address and a UDP port number of the RNC, <ip1, port1>, and the C-id.

Step 3f: When receiving the soft handover request, the HNB-GW finds the corresponding HNB according to the C-id, records a mapping between the SCCP signaling point and the HNB, that is, a signaling connection mapping between the RNC and the HNB, and simultaneously records the user plane IP address and the UDP port number <ip1, port1> of the RNC.

Step 3g: The HNB-GW allocates local IP addresses and UDP ports <ip2, port2> and <ip3, port3>, which are used for establishing a user plane connection with the RNC and the HNB respectively, replaces <ip1, port1> in the soft handover request with <ip3, port3>, and forwards the soft handover request to the HNB.

Step 3h: After receiving the soft handover request sent by the HNB-GW, the HNB allocates a user plane IP address and a UDP port <ip4, port4> to prepare for the soft handover, and returns a soft handover response (such as RL setup rsp) to the HNB-GW, where the soft handover response carries <ip4, port4>.

Step 3i: After receiving the soft handover response, the HNB-GW records mappings between <ip1, port1>, <ip2, port2>, <ip3, port3>, and <ip4, port4>, that is, user plane connection mappings between the RNC, the HNB-GW, and the HNB, replaces the user plane information <ip4, port4> of the HNB in the soft handover response with <ip2, port2>, and forwards the soft handover response to the RNC.

<ip1, port1> corresponds to <ip2, port2>, <ip2, port2> corresponds to <ip3, port3>, <ip3, port3> corresponds to <ip4, port4>, and <ip1, port1> may correspond to <ip4, port4> through <ip2, port2> and <ip3, port3>.

Step 3*j*: The RNC continues to send subsequent signaling to the HNB-GW.

The RNC sends subsequent signaling to the HNB-GW through an SCTP connection with the HNB-GW.

Step 3*k*: The HNB-GW forwards the subsequent signaling to the HNB according to the signaling connection mapping between the RNC and the HNB, to ensure forwarding of signaling messages between the RNC and the HNB.

The HNB-GW identifies the RNC according to the signaling connection mapping between the RNC and the HNB, and forwards, through an SCCP connection with the RNC, to the RNC the subsequent signaling sent by the HNB.

The subsequent signaling includes downlink synchronization (DL Sync) and uplink synchronization (UL Sync).

Step 3*l*: When forwarding downlink data to the HNB, the RNC uses <ip1, port1> and <ip2, port2> that is carried in the previous soft handover response to encapsulate the downlink data, and sends the downlink data to the HNB-GW.

The downlink data has a source IP address being ip1, a source port number being port1, a destination IP address being ip2, and a destination port number being port2.

Step 3*m*: After receiving the downlink data, the HNB-GW replaces <ip1, port1> and <ip2, port2> in the received downlink data with <ip3, port3> and <ip4, port4> respectively according to the user plane connection mappings between the RNC, the HNB-GW, and the HNB, and sends the downlink data to the HNB.

Specifically, <ip3, port3> corresponding to <ip1, port1> may be found according to the mappings between <ip1, port1> and <ip2, port2>, and between <ip2, port2> and <ip3, port3>; <ip4, port4> corresponding to <ip2, port2> may be found according to the mappings between <ip2, port2> and <ip3, port3>, and between <ip3, port3> and <ip4, port4>; the downlink data is re-encapsulated by using the found <ip3, port3> and <ip4, port4> before being sent to the RNC.

After replacement (or re-encapsulation), the source IP address of the downlink data changes to ip3, the source port number changes to port3, the destination IP address changes to ip4, and the destination port number changes to port4.

Step 3*n*: When forwarding uplink data to the RNC, the HNB uses <ip4, port4> and <ip3, port3> that is carried in the previous soft handover request to encapsulate the uplink data, and sends the uplink data to the HNB-GW.

The uplink data has a source IP address being ip4, a source port number being port4, a destination IP address being ip3, and a destination port number being port3.

Step 3*o*: After receiving the uplink data, the HNB-GW replaces <ip4, port4> and <ip3, port3> in the received uplink data with <ip2, port2> and <ip1, port1> respectively according to the user plane connection mappings between the RNC, the HNB-GW, and the HNB, and sends the uplink data to the RNC.

Specifically, <ip1, port1> corresponding to <ip3, port3> may be found according to the mappings between <ip1, port1> and <ip2, port2>, and between <ip2, port2> and <ip3, port3>; <ip2, port2> corresponding to <ip4, port4> may be found according to the mappings between <ip2, port2> and <ip3, port3>, and between <ip3, port3> and <ip4, port4>; the uplink data is re-encapsulated by using the found <ip1, port1> and <ip2, port2> before being sent to the HNB.

After replacement (or re-encapsulation), the source IP address of the uplink data changes to ip2, the source port number changes to port2, the destination IP address changes to ip1, and the destination port number changes to port1.

The HNB-GW ensures forwarding of user plane data between the RNC and the HNB.

Step 3*p*: After the service ends, the RNC sends a soft handover ending request (such as RL deletion req) to the HNB-GW.

Step 3*q*: The HNB-GW forwards the soft handover ending request to the HNB according to the signaling connection mapping between the RNC and the HNB.

Step 3*r*: After receiving the soft handover ending request, the HNB releases local resources, and returns a soft handover ending response (such as RL delete rsp) to the HNB-GW.

Step 3*s*: The HNB-GW forwards the soft handover ending response to the RNC according to the signaling connection mapping between the RNC and the HNB, and after forwarding the soft handover ending response to the RNC, deletes the local signaling connection mapping between the RNC and the HNB and user plane connection mappings between the RNC, the HNB-GW, and the HNB, and releases local user plane resources.

Step 3*t*: The RNC receives the soft handover ending response, and releases local user plane resources, and the soft handover process ends.

In the embodiment, the HNB-GW establishes a signaling connection with the RNC, so that the HNB only needs to establish a logical connection with the RNC, and signaling and user plane data exchange with the RNC is completed through the HNB-GW, thereby implementing the soft handover between a macro cell (that is, an RNC cell) and an HNB cell.

In addition, the process of the soft handover between the HNB and the RNC when the link medium between the RNC and the HNB-GW is ATM is similar to the foregoing process; the difference lies in that, the link medium between the RNC and the HNB-GW is ATM, and bearer of the Iur interface between the HNB-GW and the RNC is ATM, which needs AAL2 resource allocation according to the protocol; therefore, during the soft handover process, a process of establishing and releasing an AAL2 link is added, which is therefore not described in detail here again.

It should be noted that, in the foregoing embodiments, relatively simple scenarios in soft handover are used as examples for illustration. If the process of the soft handover between the RNC and the HNB involves other processes, such as a radio link addition message (RL addition), a radio link deletion message (RL deletion), and that the RNC and the HNB undergo outward soft handover and then undergo inward soft handover, implementation can always be performed through a method similar to the foregoing embodiments, which are not described in detail here again. For handling of an abnormal situation that occurs during the process of the soft handover between the RNC and the HNB, reference may be made to handling manners adopted when an abnormal situation occurs during the soft handover process between two macro cells or between two RNCs.

Figure 7A:
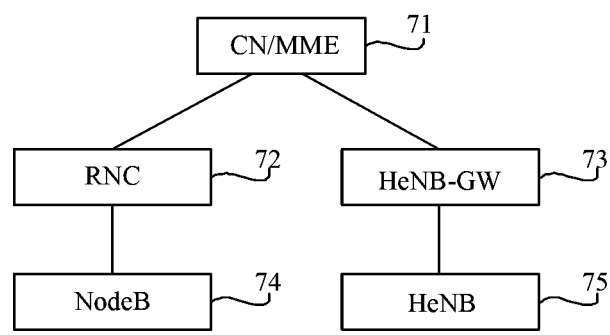
FIG. 7A is a schematic network topological diagram of a macro cell adjacent to an HeNB cell according to an embodiment of the present invention.

FIG. 7A is a schematic network topological diagram of a macro cell adjacent to an HeNB cell according to an embodiment of the present invention. As shown in FIG. 7A, a network topology according to the embodiment includes:

a core network (Core Network, CN)/mobility management entity (Mobility Management Entity, MME) 71, an RNC 72, an HeNB-GW 73, a NodeB 74, and an HeNB 75. The CN/MME 71 is connected to the RNC 72 and the HeNB-GW 73 separately, the RNC 72 is connected to the NodeB 74, and the HeNB-GW 73 is connected to the HeNB 75. In the embodiment, the HeNB 75 is connected to the MME 71 through the HeNB-GW 73, which is not limited here. In actual applications, the HeNB-GW 73 may not exist physically, and the MME 71 implements functions of the HeNB-GW 73. That is, in the embodiment, an example that the HeNB-GW 73 exists physically is taken; if the HeNB-GW 73 does not exist physically, the MME 71 implements the functions of the HeNB-GW 73 described in each embodiment of the preset invention.

The MME 71 is a control domain node in a 4G network, and the CN 71 is a control domain node in a 2/3G network. Assume that in the embodiment, the MME 71 and the CN 71 are integrated into a single network element, which may be physically divided into two network elements and has no effect on each embodiment of the present invention.

The soft handover method according to a foregoing embodiment of the present invention that is described from the perspective of the home access gateway and the home access node, and the soft handover method according to another foregoing embodiment of the present invention that is described from the perspective of the home access gateway, the home access node, and the RNC also apply to the HeNB and the RNC. In the network structure shown in FIG. 7A, the HeNB-GW is the home access gateway, and the HeNB is the home access node. The detailed soft handover process is not described in detail here again.

The soft handover process between the HeNB and the RNC is described below in detail in the following embodiment of the present invention by taking an example that the link medium between the RNC and the HeNB-GW is IP over Ethernet, and the HeNB sends a soft handover request to the RNC.

Figure 7B:
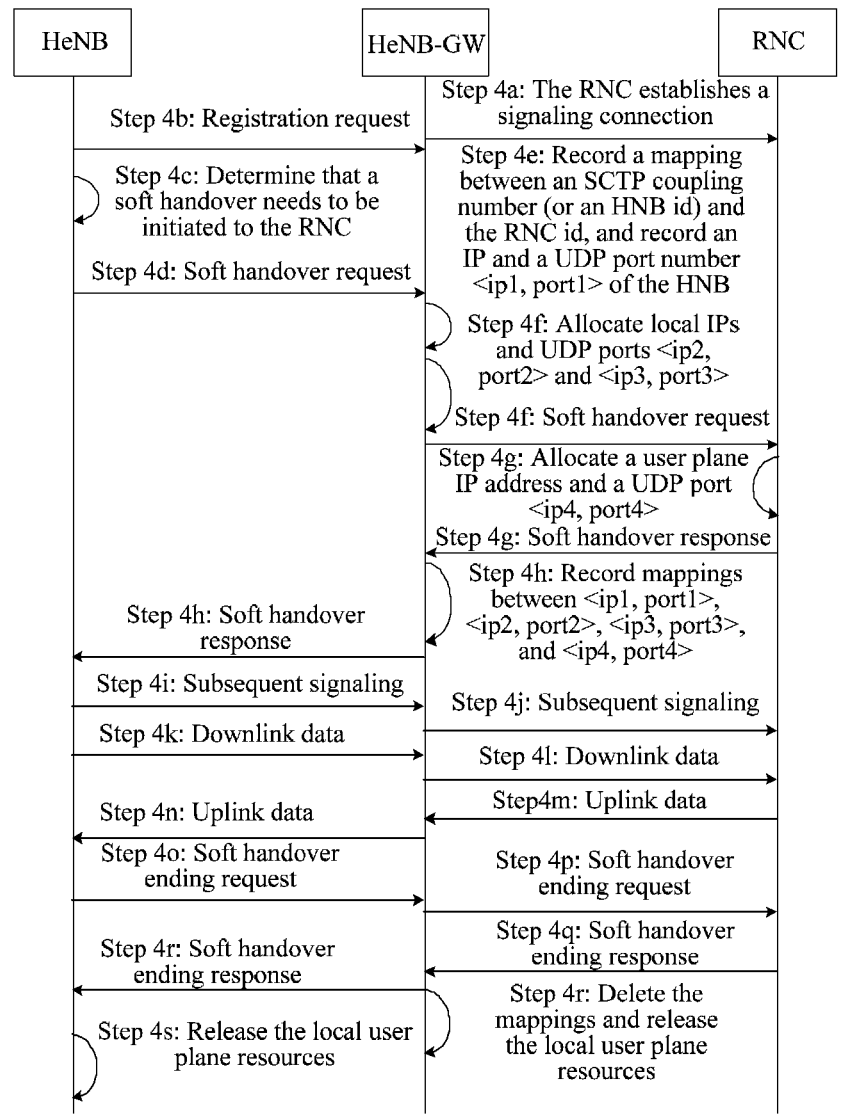
FIG. 7B is a flowchart of a soft handover method performed by an HeNB and an RNC when a link medium between the RNC and an HeNB-GW is IP over Ethernet according to an embodiment of the present invention.

FIG. 7B is a flowchart of a soft handover method performed by an HeNB and an RNC when a link medium between an RNC and an HeNB-GW is IP over Ethernet according to an embodiment of the present invention. As shown in FIG. 7B, the method according to the embodiment includes the following steps:

Step 4a: Configure, on an HeNB-GW, an SCCP destination signaling point to an RNC, so as to establish a signaling connection with the RNC.

Step 4b: An HeNB sends a registration request to the HeNB-GW, to register with the HeNB-GW.

The registration request in the embodiment includes: a name of the HeNB (that is an HeNB id well-known in the art). After the HeNB registers with the HeNB-GW, the HeNB-GW obtains the HeNB id from the registration request, and uses the HeNB id as an identifier of the HNB. Alternatively, after the HeNB registers with the HeNB-GW, the HeNB-GW allocates an SCTP coupling number to the HeNB, and uses the allocated SCTP coupling number to uniquely identify the HeNB.

Step 4c: When a UE moves from cell coverage of the HeNB to cell coverage of a NodeB under the RNC, the HeNB determines that a soft handover needs to be initiated to the RNC.

Step 4d: The HeNB sends a soft handover request (such as RL setup req) to the HeNB-GW.

The soft handover request carries a user plane IP address and a UDP port number of the HeNB, which are recorded as <ip1, port1>, and an RNC id. In addition, the soft handover request may further carry a global eNB name (global eNB id), where the global eNB id may also uniquely identify the HeNB.

Step 4e: When receiving the soft handover request, the HeNB-GW records a mapping between the SCTP coupling number (or the global eNB id, or the HeNB id) and the RNC id, that is, establishes a signaling connection mapping between the RNC and the HNB, and simultaneously records the user plane IP address and the UDP port number <ip1, port1> of the HNB.

Step 4f: The HeNB-GW allocates local IP addresses and UDP ports <ip2, port2> and <ip3, port3>, which are used for establishing a user plane connection with the HeNB and the RNC respectively, replaces <ip1, port1> in the soft handover request with <ip3, port3>, deletes the RNC id from the soft handover request, and forwards the soft handover request to the RNC.

Step 4g: After receiving the soft handover request sent by the HeNB-GW, the RNC allocates a user plane IP address and a UDP port <ip4, port4> to prepare for the soft handover, and returns a soft handover response (such as RL setup rsp) to the HeNB-GW, where the soft handover response carries <ip4, port4>.

Step 4h: After receiving the soft handover response, the HeNB-GW records mappings between <ip1, port1>, <ip2, port2>, <ip3, port3>, and <ip4, port4>, that is, establishes user plane connection mappings between the RNC, the HeNB-GW, and the HeNB, replaces the user plane information <ip4, port4> of the RNC in the soft handover response with <ip2, port2>, and forwards the soft handover response to the HeNB.

<ip1, port1> corresponds to <ip2, port2>, <ip2, port2> corresponds to <ip3, port3>, <ip3, port3> corresponds to <ip4, port4>, and <ip1, port1> may correspond to <ip4, port4> through <ip2, port2> and <ip3, port3>.

Step 4i: The HeNB continues to send subsequent signaling to the HeNB-GW.

The HeNB may send subsequent signaling to the HeNB-GW through an SCTP connection with the HeNB-GW.

Step 4j: The HeNB-GW forwards the subsequent signaling to the RNC according to the signaling connection mapping between the RNC and the HeNB, to ensure forwarding of signaling messages between the HeNB and the RNC.

The HeNB-GW identifies the RNC according to the signaling connection mapping between the RNC and the HeNB, and forwards, through an SCCP connection with the RNC, to the RNC the subsequent signaling sent by the HeNB.

The subsequent signaling includes downlink synchronization (DL Sync) and uplink synchronization (UL Sync).

Step 4k: When forwarding downlink data to the RNC, the HeNB uses <ip1, port1> and <ip2, port2> that is carried in the previous soft handover response to encapsulate the downlink data, and sends the downlink data to the HeNB-GW.

The downlink data has a source IP address being ip1, a source port number being port1, a destination IP address being ip2, and a destination port number being port2.

Step 4l: After receiving the downlink data, the HeNB-GW replaces <ip1, port1> and <ip2, port2> in the received downlink data with <ip3, port3> and <ip4, port4> respectively according to the user plane connection mappings between the RNC, the HeNB-GW, and the HeNB, and sends the downlink data to the RNC.

Specifically, <ip3, port3> corresponding to <ip1, port1> may be found according to the mappings between <ip1, port1> and <ip2, port2>, and between <ip2, port2> and <ip3, port3>; <ip4, port4> corresponding to <ip2, port2> may be found according to the mappings between <ip2, port2> and <ip3, port3>, and between <ip3, port3> and <ip4, port4>; the downlink data is re-encapsulated by using the found <ip3, port3> and <ip4, port4> before being sent to the RNC.

After replacement (or re-encapsulation), the source IP address of the downlink data changes to ip3, the source port number changes to port3, the destination IP address changes to ip4, and the destination port number changes to port4.

Step 4m: When forwarding uplink data to the HeNB, the RNC uses <ip4, port4> and <ip3, port3> that is carried in the previous soft handover request to encapsulate the uplink data, and sends the uplink data to the HeNB-GW.

The uplink data has a source IP address being ip4, a source port number being port4, a destination IP address being ip3, and a destination port number being port3.

Step 4n: After receiving the uplink data, the HeNB-GW replaces <ip4, port4> and <ip3, port3> in the received uplink data with <ip2, port2> and <ip1, port1> respectively according to the user plane connection mappings between the RNC, the HeNB-GW, and the HeNB, and sends the uplink data to the HeNB.

Specifically, <ip1, port1> corresponding to <ip3, port3> may be found according to the mappings between <ip1, port1> and <ip2, port2>, and between <ip2, port2> and <ip3, port3>; <ip2, port2> corresponding to <ip4, port4> may be found according to the mappings between <ip2, port2> and <ip3, port3>, and between <ip3, port3> and <ip4, port4>; the uplink data is re-encapsulated by using the found <ip1, port1> and <ip2, port2> before being sent to the HeNB.

After replacement (or re-encapsulation), the source IP address of the uplink data changes to ip2, the source port number changes to port2, the destination IP address changes to ip1, and the destination port number changes to port1.

The HeNB-GW ensures forwarding of user plane data between the RNC and the HeNB.

STEP 4o: After the service ends, the HeNB sends a soft handover ending request (such as RL deletion req) to the HeNB-GW.

Step 4p: The HeNB-GW forwards the soft handover ending request to the RNC according to the signaling connection mapping between the RNC and the HeNB.

Step 4q: After receiving the soft handover ending request, the RNC releases local resources, and returns a soft handover ending response (such as RL delete rsp) to the HNB-GW.

Step 4r: The HeNB-GW forwards the soft handover ending response to the HeNB according to the signaling connection mapping between the RNC and the HeNB, and after forwarding the soft handover ending response to the HeNB, deletes the local signaling connection mapping between the RNC and the HeNB and user plane connection mappings between the RNC, the HeNB-GW, and the HeNB, and releases local user plane resources.

Step 4s: The HeNB receives the soft handover ending response, and releases local user plane resources, and the soft handover process ends.

In the embodiment, the HeNB-GW establishes a signaling connection with the RNC, so that the HeNB only needs to establish a logical connection with the RNC, and signaling and user plane data exchange with the RNC is completed through the HeNB-GW, thereby implementing the soft handover between a macro cell and an HeNB cell.

Figure 8A:
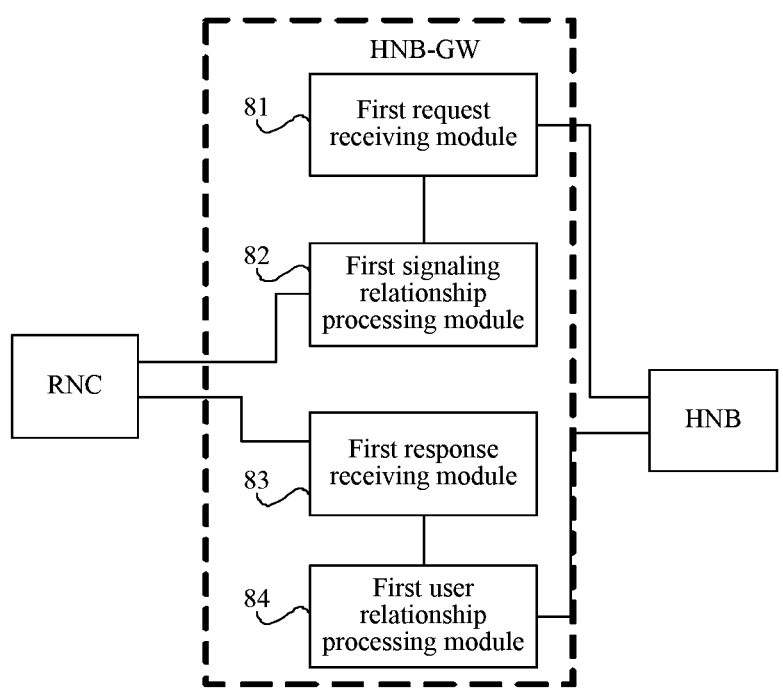
FIG. 8A is a schematic structural diagram of a home access gateway according to an embodiment of the present invention.

FIG. 8A is a schematic structural diagram of a home access gateway according to an embodiment of the present invention. As shown in FIG. 8A, the home access gateway according to the embodiment includes: a first request receiving module 81, a first signaling relationship processing module 82, a first response receiving module 83, and a first user relationship processing module 84.

The first request receiving module 81 is connected to a home access node, and is configured to receive a soft handover request sent by the home access node, where the soft handover request includes user plane information of the home access node and an identifier of an RNC. The first signaling relationship processing module 82 is connected to the first request receiving module 81 and the RNC, and is configured to establish a signaling connection mapping between the home access node and the RNC according to the identifier of the RNC in the soft handover request received by the first request receiving module 81, and forward the soft handover request to the RNC based on forwarding connection resource information allocated to the RNC. The forwarding connection resource information includes information pointing to the home access gateway. The first response receiving module 83 is connected to the RNC, and is configured to receive a soft handover response returned by the RNC according to the soft handover request, where the soft handover response includes connection resource information of the RNC. The first user relationship processing module 84 is connected to the first response receiving module 83 and the home access node, and is configured to establish a user plane connection mapping between the home access node and the RNC according to the user plane information of the home access node, the forwarding connection resource information, forwarding user plane information allocated to the home access node, and the connection recourse information of the RNC in the first response receiving module 83, and forward the soft handover response to the home access node based on the forwarding user plane information. The forwarding user plane information includes information pointing to the home access gateway.

Each functional module of the home access gateway according to the embodiment may be configured to execute the processes of the soft handover method according to an embodiment of the present invention that is described from the perspective of the home access gateway and the soft handover method shown in FIG. 2, and the detailed working principles are not described here again. For details, refer to the description of the method according to the embodiment.

The home access gateway in the embodiment may be an HNB-GW; accordingly, the home access node is an HNB. The home access gateway may further be an HeNB-GW; accordingly, the home access node is an HeNB.

In the embodiment, the home access gateway acts as a proxy of the RNSAP protocol stack between the home access node and the RNC, provides a physical Iur interface, and establishes a signaling connection with the RNC, to enable the home access node to establish a logical connection with the RNC; signaling and user plane data exchange between the home access node and the RNC is completed through the home access gateway, thereby implementing the soft handover process, and resolving the soft handover problem when a macro cell is adjacent to a home access node cell. Because the soft handover has a short time delay, and a higher success rate of handover compared with the hard handover, the home access gateway according to the embodiment enables the soft handover to be implemented between a home access node cell and an RNC cell, and improves user experience. Moreover, due to proxy of the home access gateway according to the embodiment, the RNC may support a large number of home access nodes to simultaneously establish logical connection relationships with the RNC; therefore, the soft handover between an RNC cell and a home access node cell is neither limited by the number of Iur connections of the RNC, nor affected by location changes of the home access nodes. In addition, because the home access gateway according to the embodiment establishes a physical connection with the RNC, the number and location changes of the home access nodes have no effect on the maintenance cost and signaling load, so that the network works in a low-load, easy-to-plan, and easy-to-maintain state. Furthermore, the home access gateway according to the embodiment only acts as a proxy of the RNSAP protocol stack, and does not need to include the RNSAP protocol stack, so that the home access gateway does not conflict with the architecture stipulated by the protocol, which helps evolution towards the protocol and results in a lower implementation cost.

Figure 8B:
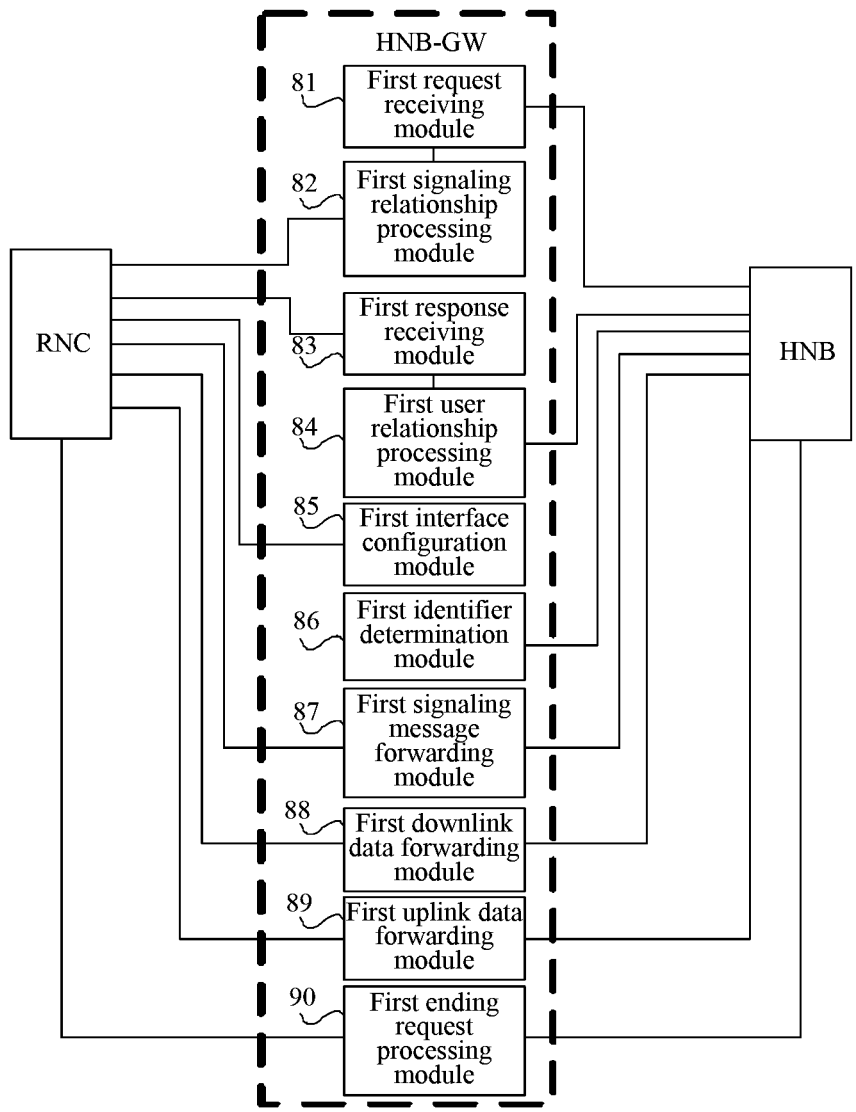
FIG. 8B is a schematic structural diagram of a home access gateway according to another embodiment of the present invention.

FIG. 8B is a schematic structural diagram of a home access gateway according to another embodiment of the present invention. The embodiment is implemented based on the embodiment shown in FIG. 8A, and as shown in FIG. 8B, the home access gateway according to the embodiment further includes: a first receiving configuration module 85 and a first identifier determination module 86.

The first interface configuration module 85 is connected to an RNC, and is configured to configure a physical Iur interface before the first request receiving module 81 receives a soft handover request from a home access node, and establish a signaling connection with the RNC.

The first identifier determination module 86 is connected to the home access node, and is configured to receive a registration request from the home access node before the first request receiving module 81 receives the soft handover request from the home access node, determine an identifier of the home access node according to the registration request, and save the identifier of the home access node.

Further, the first identifier determination module 86 may specifically obtain, from the registration request sent by the home access node, a name of the home access node (an id of the home access node), and use the name of the home access node as the identifier of the home access node; or is specifically configured to allocate a coupling number to the home access node according to the registration request, and use the allocated coupling number as the identifier of the home access node.

The first signaling relationship processing module 82 according to the embodiment is specifically configured to establish a signaling connection mapping between the home access node and the RNC according to the identifier of the RNC, allocate forwarding connection resource information to the RNC, delete the identifier of the RNC from the soft handover request, replace the user plane information of the home access node in the soft handover request with the forwarding connection resource information, and forward the soft handover request to the RNC.

The home access gateway according to the embodiment further includes any one or any combination of the following modules: a first signaling message forwarding module 87, a first downlink data forwarding module 88, and a first uplink data forwarding module 89.

The first signaling message forwarding module 87 is connected to the home access node and the RNC, and is configured to receive a signaling message sent by the home access node, and forward the signaling message to the RNC according to the signaling connection mapping between the home access node and the RNC.

The first downlink data forwarding module 88 is connected to the home access node and the RNC, and is configured to receive downlink data sent according to the forwarding user plane information by the home access node, and forward the downlink data to the RNC according to the user plane connection mapping between the home access node and the RNC based on forwarding resource connection information.

The first uplink data forwarding module 89 is connected to the home access node and the RNC, and is configured to receive uplink data sent by the RNC according to the forwarding connection resource information, and forward the uplink data to the home access node according to the user plane connection mapping between the home access node and the RNC based on the forwarding user plane information.

The home access gateway according to the embodiment may further include: a first ending request processing module 90. The first ending request processing module 90 is connected to the home access node and the RNC, and is configured to receive a soft handover ending request sent by the home access node, forward the soft handover ending request to the RNC according to the signaling connection mapping between the home access node and the RNC, delete the signaling connection mapping between the home access node and the RNC and the user plane connection mapping between the home access node and the RNC, and release the forwarding user plane information and the forwarding connection resource information.

Each of the foregoing functional modules may be configured to execute corresponding processes in the foregoing method embodiment (the soft handover method shown in FIG. 4A or FIG. 4B), and the detailed working principles thereof are not described in detail here again. For details, reference may be made to the description of the method embodiments.

In the embodiment, the home access gateway acts as a proxy of the RNSAP protocol stack between the home access node and the RNC, provides a physical Iur interface, and establishes a signaling connection with the RNC, to enable the home access node to establish a logical connection with the RNC; signaling and user plane data exchange between the home access node and the RNC is completed through the home access gateway, thereby implementing the soft handover process, and resolving the soft handover problem when a macro cell is adjacent to a home access node cell. Meanwhile, the home access gateway according to the embodiment further has the following advantages: improving user experience; preventing the soft handover between an RNC cell and a home access node cell from being limited by the number of Iur connections of the RNC and from being affected by location changes of the home access nodes; enabling the network to work in a low-load, easy-to-plan, and easy-to-maintain state; not conflicting with the architecture stipulated by the protocol, helping evolution towards the protocol and resulting in a lower implementation cost.

Figure 9A:
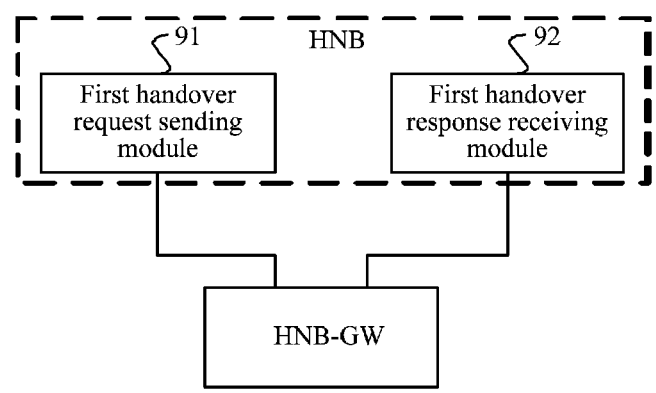
FIG. 9A is a schematic structural diagram of a home access node according to an embodiment of the present invention.

FIG. 9A is a schematic structural diagram of a home access node according to an embodiment of the present invention. As shown in FIG. 9A, the home access node according to the embodiment includes: a first handover request sending module 91 and a first handover response receiving module 92.

The first handover request sending module 91 is connected to a home access gateway, and is configured to send a soft handover request to the home access gateway, to enable the home access gateway to establish a signaling connection mapping between the home access node and an RNC according to the soft handover request, where the soft handover request includes user plane information of the home access node and an identifier of the RNC. The first handover response receiving module 92 is connected to the home access gateway, and is configured to receive a soft handover response sent by the home access gateway, where the soft handover response is returned by the RNC to the home access gateway according to the soft handover request forwarded by the home access gateway, and is forwarded to the home access node after the home access gateway establishes a user plane connection mapping between the home access node and the RNC according to the soft handover response, and the soft handover response includes forwarding user plane information allocated by the home access gateway to the home access node. The forwarding user plane information includes information pointing to the home access gateway.

Each functional modules of the home access node according to the embodiment may be configured to execute the processes of the soft handover method according to an embodiment of the present invention that is described from the perspective of the home access node and the soft handover method shown in FIG. 3, and the detailed working principles thereof are not described in detail here again. For details, reference may be made to the description of the method according to the embodiment.

The home access gateway in the embodiment may be an HNB-GW; accordingly, the home access node is an HNB. The home access gateway may further be an HeNB-GW; accordingly, the home access node is an HeNB.

The home access node according to the embodiment establishes, based on a physical connection established between the home access gateway and the RNC, a logical connection with the RNC, and completes signaling and user plane data exchange with the RNC through the home access gateway, thereby implementing the soft handover between a macro cell and an HNB cell, and improving user experience.

Figure 9B:
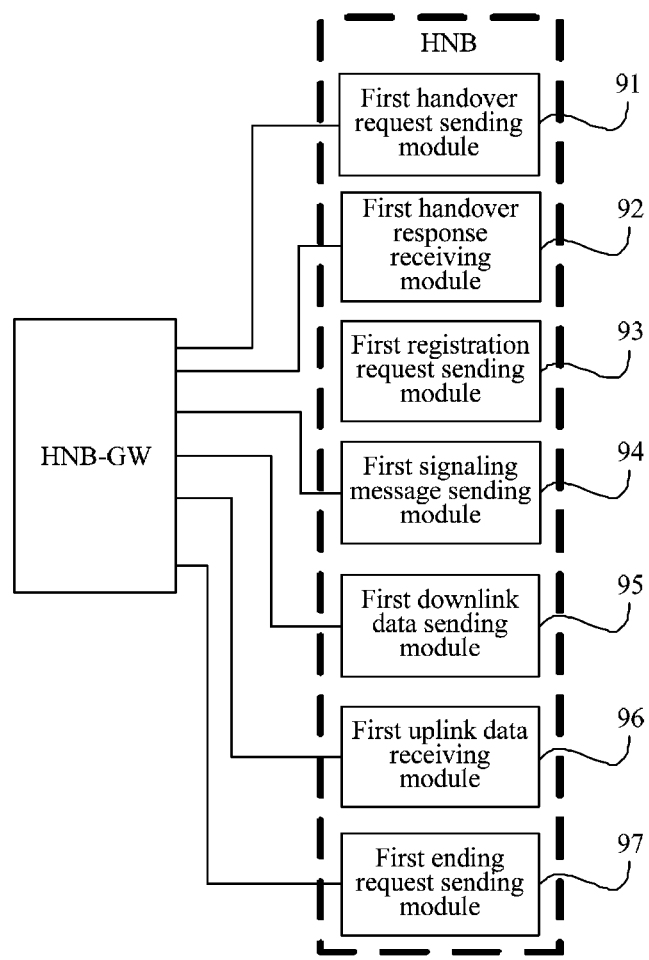
FIG. 9B is a schematic structural diagram of a home access node according to another embodiment of the present invention.

FIG. 9B is a schematic structural diagram of a home access node according to another embodiment of the present invention. The embodiment is implemented based on the embodiment shown in FIG. 9A, and as shown in FIG. 9B, the home access node according to the embodiment further includes a first registration request sending module 93.

The first registration request sending module 93 is connected to the home access gateway, and is configured to send a registration request to the home access gateway before the first handover request sending module 91 sends a soft handover request to the home access gateway, to enable the home access gateway to determine and save an identifier of the home access node according to the registration request. The registration request includes a name of the home access node, and the identifier of the home access node may be the name of the home access node or a coupling number allocated by the home access gateway to the home access node according to the registration request.

Further, the home access node according to the embodiment further includes any one or any combination of the following modules: a first signaling message sending module 94, a first downlink data sending module 95, and a first uplink data receiving module 96.

The first signaling message sending module 94 is connected to the home access node, and is configured to send a signaling message to the home access gateway, to enable the home access gateway to forward the signaling message to the RNC according to the signaling connection mapping between the home access node and the RNC.

The first downlink data sending module 95 is connected to the home access node, and is configured to send downlink data to the home access gateway according to the forwarding user plane information, to enable the home access gateway to forward the downlink data to the RNC according to the user plane connection mapping between the home access node and the RNC based on the forwarding resource connection information.

The first uplink data receiving module 96 is connected to the home access gateway, and is configured to receive uplink data sent by the RNC and forwarded by the home access gateway according to the user plane connection mapping between the home access node and the RNC based on the forwarding user plane information.

The home access node according to the embodiment further includes: a first ending request sending module 97.

The first ending request sending module 97 is connected to the home access node, and is configured to send a soft handover ending request to the home access gateway, to enable the home access gateway to forward the soft handover ending request to the RNC according to the signaling connection mapping between the home access node and the RNC, delete the signaling connection mapping between the home access node and the RNC and the user plane connection mapping between the home access node and the RNC, and release the forwarding user plane information and the forwarding connection resource information allocated to the RNC.

Each of the foregoing functional modules may be configured to execute corresponding processes in the foregoing method embodiments (the soft handover method shown in FIG. 4A or FIG. 4B), and the detailed working principles thereof are not described in detail here again. For details, reference may be made to the description of the method embodiments.

The home access node according to the embodiment establishes, based on a physical connection established between the home access gateway and the RNC, a logical connection with the RNC, and completes signaling and user plane data exchange with the RNC through the home access gateway, thereby implementing the soft handover between a macro cell and a home access node cell, and improving user experience.

Figure 10A:
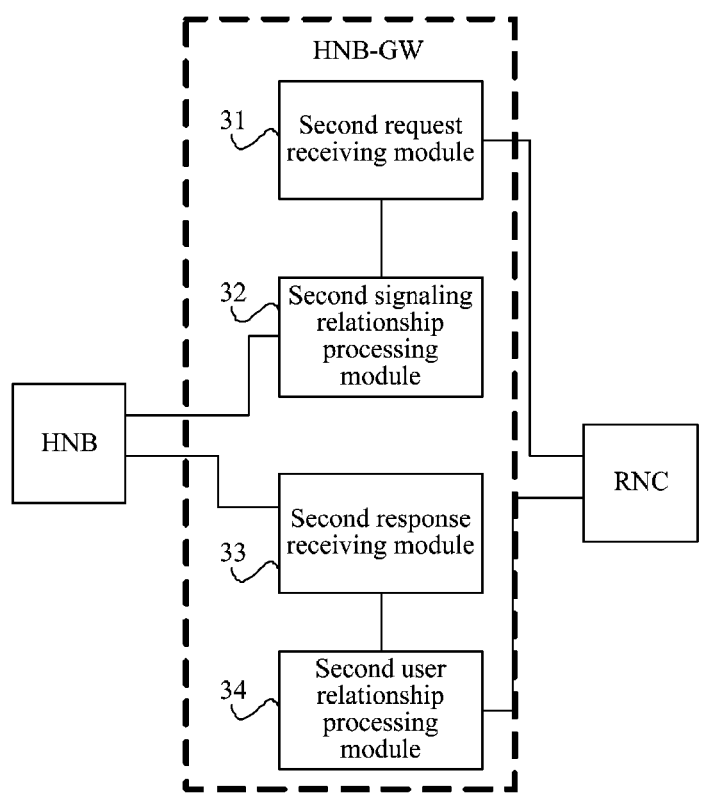
FIG. 10A is a schematic structural diagram of a home access gateway according to still another embodiment of the present invention.

FIG. 10A is a schematic structural diagram of a home access gateway according to another embodiment of the present invention. As shown in FIG. 10A, the home access gateway according to the embodiment includes: a second request receiving module 31, a second signaling relationship processing module 32, a second response receiving module 33, and a second user relationship processing module 34.

The second request receiving module 31 is connected to an RNC, and is configured to receive a soft handover request sent by the RNC, where the soft handover request includes connection resource information of the RNC and an identifier of a home access node. The second signaling relationship processing module 32 is connected to the second request receiving module 31 and the home access node, and is configured to establish a signaling connection mapping between the RNC and the home access node according to the identifier of the home access node in the soft handover request received by the second request receiving module 31, and forward the soft handover request to the home access node based on forwarding user plane information allocated to the home access node. The forwarding user plane information includes information pointing to the home access gateway. The second response receiving module 33 is connected to the home access node, and is configured to receive a soft handover response returned by the home access node according to the soft handover request, where the soft handover response includes user plane information of the home access node. The second user relationship processing module 34 is connected to the second response receiving module 33 and the RNC, and is configured to establish a user plane connection mapping between the home access node and the RNC according to the user plane information of the home access node, the forwarding user plane information, forwarding connection resource information allocated to the RNC, and the connection resource information of the RNC in the soft handover response received by the second response receiving module 33, and forward the soft handover response to the RNC based on the forwarding connection resource information. The forwarding connection resource information includes information pointing to the home access gateway.

Each functional module of the home access gateway according to the embodiment may be configured to execute the process of the soft handover method shown in FIG. 5A, and the detailed working principles thereof are not described in detail here again. For details, reference may be made to the description of the method embodiment.

The home access gateway in the embodiment may be an HNB-GW; accordingly, the home access node is an HNB. The home access gateway may further be an HeNB-GW; accordingly, the home access node is an HeNB.

In the embodiment, the home access gateway acts as a proxy of the RNSAP protocol stack between the home access node and the RNC, provides a physical Iur interface, and establishes a signaling connection with the RNC, to enable the home access node to establish a logical connection with the RNC; signaling and user plane data exchange between the home access node and the RNC is completed through the home access gateway, thereby implementing the soft handover process, and resolving the soft handover problem when a macro cell is adjacent to a home access node cell. Because the soft handover has a short time delay, and a higher success rate of handover compared with the hard handover, the home access gateway in the embodiment enables the soft handover to be implemented between a home access node cell and an RNC cell, and improves user experience. Moreover, due to proxy of the home access gateway in the embodiment, the RNC may support a large number of home access nodes to simultaneously establish logical connection relationships with the RNC; therefore, the soft handover between an RNC cell and a home access node cell is neither limited by the number of Iur connections of the RNC, nor affected by location changes of the home access nodes. In addition, because the home access gateway in the embodiment establishes a physical connection with the RNC, the number and location changes of the home access nodes have no effect on the maintenance cost and signaling load, so that the network works in a low-load, easy-to-plan, and easy-to-maintain state. Furthermore, the home access gateway in the embodiment acts only as a proxy of the RNSAP protocol stack, and does not need to include the RNSAP protocol stack, so that the home access gateway does not conflict with the architecture stipulated by the protocol, which helps evolution towards the protocol and results in a lower implementation cost.

Figure 10B:
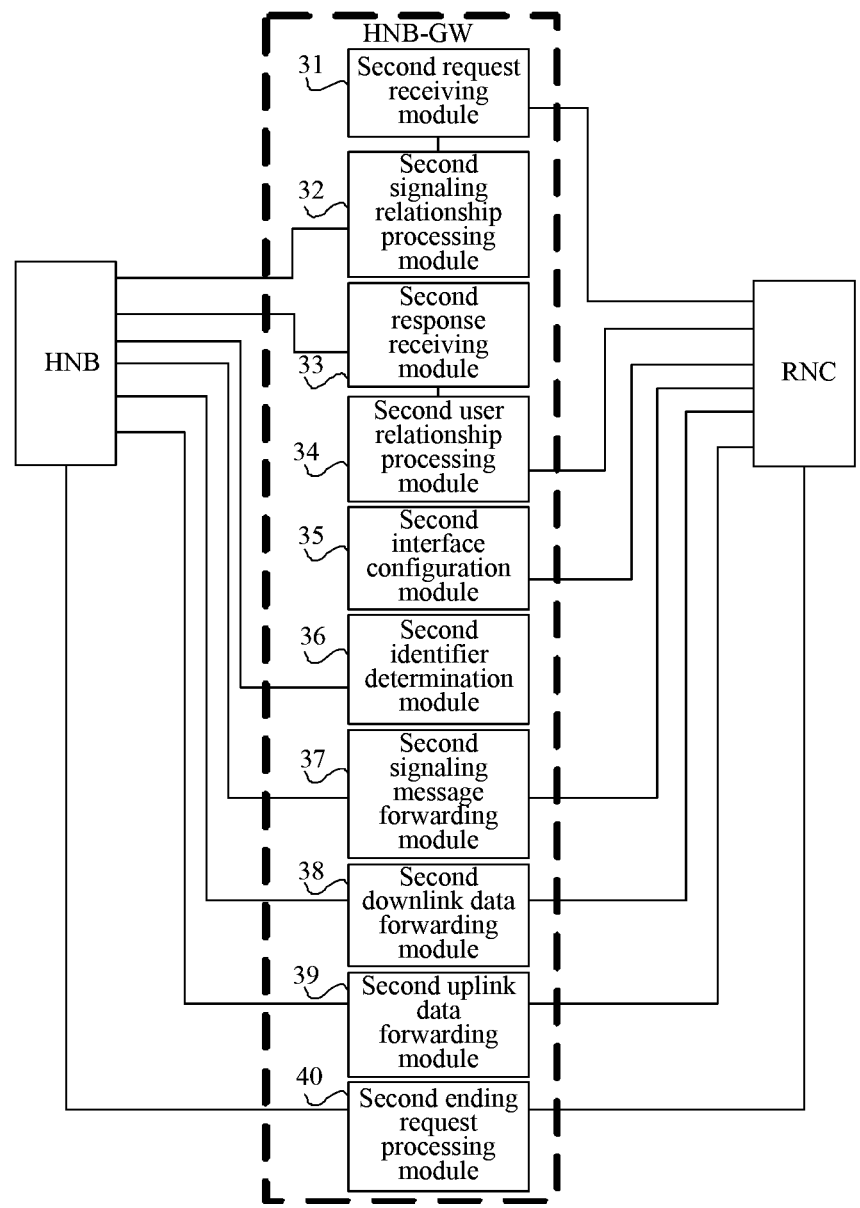
FIG. 10B is a schematic structural diagram of a home access gateway according to still another embodiment of the present invention.

FIG. 10B is a schematic structural diagram of a home access gateway according to another embodiment of the present invention. The embodiment is implemented based on the embodiment shown in FIG. 10A, and as shown in FIG. 10B, the home access gateway according to the embodiment further includes: a second interface configuration module 35 and a second identifier determination module 36.

The second interface configuration module 35 is connected to an RNC, and is configured to configure a physical Iur interface, to establish a signaling connection with the RNC.

The second identifier determination module 36 is connected to a home access node, and is configured to receive a registration request from the home access node, determine an identifier of the home access node according to the registration request, and save the identifier of the home access node.

Further, the second identifier determination module 36 is specifically configured to obtain, from the registration request sent by the home access node, a name of the home access node, and use the name of the home access node as the identifier of the home access node; alternatively, is specifically configured to obtain, from the registration request, scrambling code information of the home access node, and use the scrambling code information of the home access node as the identifier of the home access node.

Further, the home access gateway according to the embodiment further includes any one or any combination of the following modules: a second signaling message forwarding module 37, a second downlink data forwarding module 38, and a second uplink data forwarding module 39.

The second signaling message forwarding module 37 is connected to the RNC and the home access node, and is configured to receive a signaling message sent by the RNC, and forward the signaling message to the home access node according to the signaling connection mapping between the HNB and the RNC.

The second downlink data forwarding module 38 is connected to the RNC and the home access node, and is configured to receive downlink data sent by the RNC according to the forwarding connection resource information, and forward the downlink data to the home access node according to the user plane connection mapping between the home access node and the RNC based on the forwarding user plane information.

The second uplink data forwarding module 39 is connected to the RNC and the home access node, and is configured to receive uplink data sent by the home access node according to the forwarding user plane information, and forward the uplink data to the RNC according to the user plane connection mapping between the home access node and the RNC based on the forwarding connection resource information.

The home access gateway according to the embodiment further includes: a second ending request processing module 40.

The second ending request processing module 40 is connected to the RNC and the home access node, and is configured to receive a soft handover ending request sent by the RNC, forward the soft handover ending request to the home access node according to the signaling connection mapping between the home access node and the RNC, delete the signaling connection mapping between the home access node and the RNC and the user plane connection mapping between the home access node and the RNC, and release the forwarding user plane information and the forwarding connection resource information.

Each of the foregoing functional modules may be configured to execute the corresponding processes of the soft handover method according to another embodiment of the present invention that is described from the perspective of the home access gateway and the soft handover method shown in FIG. 6, and the detailed working principles thereof are not described here again. For details, reference may be made to the description of the method embodiment.

In the embodiment, the home access gateway acts as a proxy of the RNSAP protocol stack between the home access node and the RNC, provides a physical Iur interface, and establishes a signaling connection with the RNC, to enable the home access node to establish a logical connection with the RNC; signaling and user plane data exchange between the home access node and the RNC is completed through the home access gateway, thereby implementing the soft handover process, and resolving the soft handover problem when a macro cell is adjacent to a home access node cell. The home access gateway according to the embodiment further has the following advantages: improving user experience; preventing the soft handover between an RNC cell and a home access node cell from being limited by the number of Iur connections of the RNC and from being affected by location changes of the home access nodes; enabling the network to work in a low-load, easy-to-plan, and easy-to-maintain state; not conflicting with the architecture stipulated by the protocol, helping evolution towards the protocol and resulting in a lower implementation cost.

Figure 11A:
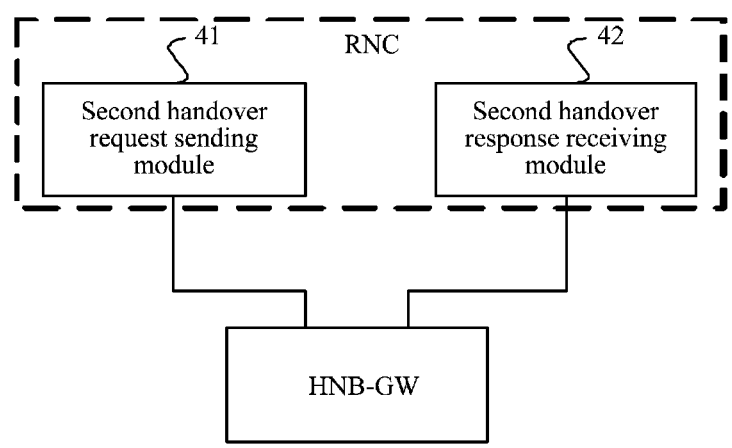
FIG. 11A is a schematic structural diagram of an RNC according to an embodiment of the present invention.

FIG. 11A is a schematic structural diagram of an RNC according to an embodiment of the present invention. As shown in FIG. 11A, the RNC according to the embodiment includes: a second handover request sending module 41 and a second handover response receiving module 42.

The second handover request sending module 41 is connected to a home access gateway, and is configured to send a soft handover request to the home access gateway, to enable the home access gateway to establish a signaling connection mapping between a home access node and the RNC according to the soft handover request, where the soft handover request includes connection resource information of the RNC and an identifier of the home access node. The second handover response receiving module 42 is connected to the home access gateway, and is configured to receive a soft handover response sent by the home access gateway, where the soft handover response is returned by the home access node to the home access gateway according to the soft handover request forwarded by the home access gateway and is forwarded to the RNC after the home access gateway establishes a user plane connection mapping between the home access node and the RNC according to the soft handover response, and the soft handover response includes forwarding connection resource information allocated by the home access gateway to the RNC. The forwarding connection resource information includes information pointing to the home access gateway.

Each of the functional modules of the RNC according to the embodiment may be configured to execute the processes of the soft handover method according to another embodiment of the present invention that is described from the perspective of the RNC and the soft handover method shown in FIG. 5B, and the detailed working principles thereof are not described here again. For details, reference may be made to the description of the method embodiment.

The home access gateway in the embodiment may be an HNB-GW; accordingly, the home access node is an HNB. The home access gateway may further be an HeNB-GW; accordingly, the home access node is an HeNB.

The RNC according to the embodiment allows, based on a physical connection established with the home access gateway, the home access node to establish a logical connection with the RNC, and completes signaling and user plane data exchange with the home access node through the home access gateway, thereby implementing the soft handover between a macro cell and a home access node cell, and improving user experience.

Figure 11B:
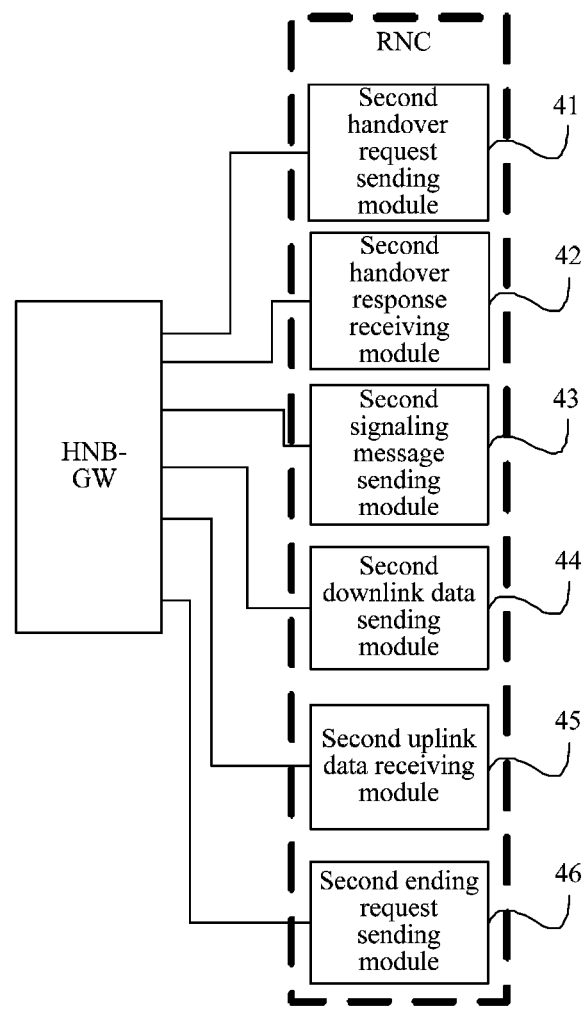
FIG. 11B is a schematic structural diagram of an RNC according to another embodiment of the present invention.

FIG. 11B is a schematic structural diagram of an RNC according to another embodiment of the present invention. The embodiment is implemented based on the embodiment shown in FIG. 11A, and as shown in FIG. 11B, the RNC according to the embodiment further includes any one or any combination of the following modules: a second signaling message sending module 43, a second downlink data sending module 44, and a second uplink data receiving module 45.

The second signaling message sending module 43 is connected to the home access gateway, and is configured to send a signaling message to the home access gateway according to the forwarding connection resource information, to enable the home access gateway to forward the signaling message to the home access node according to the signaling connection mapping between the home access node and the RNC.

The second downlink data sending module 44 is connected to the home access gateway, and is configured to send downlink data to the home access gateway according to the forwarding connection resource information, to enable the home access gateway to forward the downlink data to the home access node according to the user plane connection mapping between the home access node and the RNC based on the forwarding user plane information allocated to the HNB.

The second uplink data receiving module 45 is connected to the home access gateway, and is configured to receive uplink data sent by the home access node and forwarded by the home access gateway according to the user plane connection mapping between the home access node and the RNC based on the forwarding connection resource information.

The RNC according to the embodiment further includes: a second ending request sending module 46.

The second ending request sending module 46 is connected to the home access gateway, and is configured to send a soft handover ending request to the home access gateway, to enable the home access gateway to forward the soft handover ending request to the HNB according to the signaling connection mapping between the home access node and the RNC, delete the signaling connection mapping between the home access node and the RNC and the user plane connection mapping between the home access node and the RNC, and release the forwarding connection resource information and the forwarding user plane information allocated to the home access node.

Each of the foregoing functional modules may be configured to execute corresponding processes in the method embodiment (the soft handover method shown in FIG. 6), and the detailed working principles thereof are not described in detail here again. For details, reference may be made to the description of the method embodiments.

The RNC according to the embodiment allows, based on a physical connection established with the home access gateway, the home access node to establish a logical connection with the RNC, and completes signaling and user plane data exchange with the home access node through the home access gateway, thereby implementing the soft handover between a macro cell and a home access node cell, and improving user experience.

Figure 12:
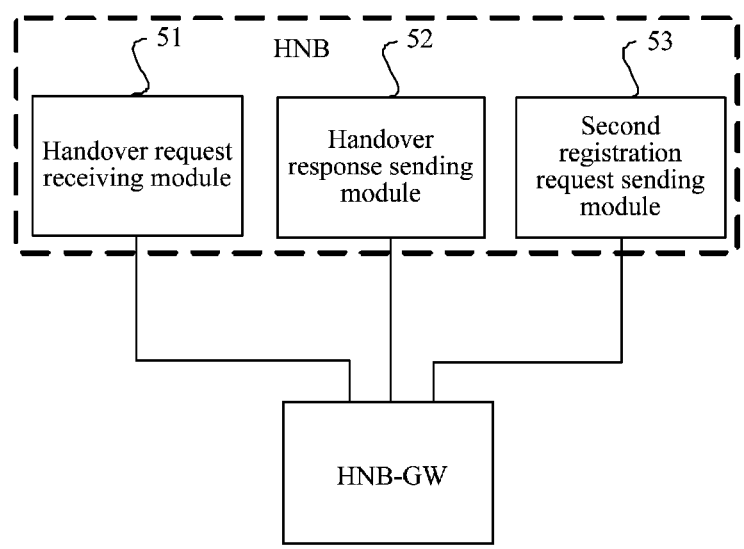
FIG. 12 is a schematic structural diagram of a home access node according to another embodiment of the present invention.

FIG. 12 is a schematic structural diagram of a home access node according to another embodiment of the present invention. As shown in FIG. 12, the home access node according to the embodiment includes: a handover request receiving module 51 and a handover response sending module 52.

The handover request receiving module 51 is connected to a home access gateway, and is configured to receive a soft handover request forwarded by the home access gateway based on forwarding user plane information allocated to the home access node, where the soft handover request includes an identifier of the home access node, and the soft handover request is sent from an RNC to the home access gateway, and is forwarded after the home access gateway establishes a signaling connection mapping between the RNC and the home access node according to the soft handover request. The forwarding user plane information includes information pointing to the home access gateway. The handover response sending module 52 is connected to the handover request receiving module 51 and the home access gateway, and is configured to send a soft handover response to the home access gateway according to the soft handover request, where the soft handover response includes user plane information of the home access node, to enable the home access gateway to establish a user plane connection mapping between the home access node and the RNC according to the soft handover response, and forward the soft handover response to the RNC.

Each functional module of the RNC according to the embodiment may be configured to execute the process of the foregoing soft handover method described from the perspective of the home access node, and the detailed working principles thereof are not described in detail here again. For details, reference may be made to the description of the method embodiment.

The HNB according to the embodiment further includes: a second registration request sending module 53.

The second registration request sending module 53 is connected to the home access gateway, and is configured to send a registration request to the home access gateway, to enable the home access gateway to determine an identifier of the home access node according to the registration request. The identifier of the home access node may be a name of the home access node, or scrambling code information of the home access node.

The home access node in the embodiment may be an HNB; accordingly, the home access gateway is an HNB-GW. The home access node may further be an HeNB; accordingly, the home access gateway is an HeNB-GW.

The home access node according to the embodiment establishes, based on a physical connection established between the home access gateway and the RNC, a logical connection with the RNC, and completes signaling and user plane data exchange with the RNC through the home access gateway, thereby implementing the soft handover between a macro cell and a home access node cell, and improving user experience.

Persons of ordinary skills in the art should understand that all or part of the steps of the methods in the embodiments may be implemented by a program instructing relevant hardware. The program may be stored in a computer readable storage medium. When the program is run, the above steps of the methods in the embodiments are performed. The storage medium may be any medium capable of storing program codes, such as ROM, RAM, magnetic disk, or optical disk, and the like.

Finally, it should be noted that the above embodiments are merely intended for describing the technical solutions of the present invention, other than limiting the present invention. Although the present invention is described in detail with reference to the foregoing embodiments, persons of ordinary skills in the art should understand that they may still make modifications to the technical solutions described in the foregoing embodiments, or make equivalent substitutions to some or all the technical features thereof, without departing from the idea and scope of the technical solutions of the embodiments of the present invention.

What is claimed is:

1. A soft handover method, comprising:
   receiving, by a home access gateway, a soft handover request sent by a home access node, wherein the soft handover request comprises user plane information of the home access node and an identifier of a radio network controller (RNC);
   establishing, by the home access gateway according to the identifier of the RNC, a signaling connection mapping between the home access node and the RNC, and forwarding the soft handover request to the RNC based on forwarding connection resource information allocated to the RNC, wherein the forwarding connection resource information comprises first information pointing to the home access gateway;
   receiving, by the home access gateway, a soft handover response returned by the RNC according to the soft handover request, wherein the soft handover response comprises connection resource information of the RNC; and
   establishing, by the home access gateway, a user plane connection mapping between the home access node and the RNC according to (a) the user plane information of the home access node, (b) the forwarding connection resource information, (c) forwarding user plane information allocated to the home access node, and (d) the connection resource information of the RNC, and
   forwarding the soft handover response to the home access node based on the forwarding user plane information, wherein the forwarding user plane information comprises second information pointing to the home access gateway.

2. The soft handover method according to claim 1, wherein before the receiving, by the home access gateway, the soft handover request sent by the home access node, the method comprises:
   configuring, by the home access gateway, a physical Iur interface, to establish a signaling connection with the RNC; and
   receiving, by the home access gateway, a registration request from the home access node, determining an identifier of the home access node according to the registration request, and saving the identifier of the home access node.

3. The soft handover method according to claim 2, wherein the determining, by the home access gateway, the identifier of the home access node according to the registration request comprises one of the following:
   (a) obtaining, by the home access gateway and from the registration request, a name of the home access node, and using the name of the home access node as the identifier of the home access node; and
   (b) allocating, by the home access gateway according to the registration request, a coupling number to the home access node, and using the allocated coupling number as the identifier of the home access node.

4. The soft handover method according to claim 1, wherein the forwarding, by the home access gateway, the soft handover request to the RNC based on the forwarding connection resource information allocated to the RNC comprises:
   deleting, by the home access gateway, the identifier of the RNC from the soft handover request;
   replacing, by the home access gateway, the user plane information of the home access node in the soft handover request with the forwarding connection resource information; and
   forwarding, by the home access gateway, the soft handover request to the RNC.

5. The soft handover method according to claim 1, wherein after the forwarding, by the home access gateway, the soft handover response to the home access node based on the forwarding user plane information, the method comprises one of the following:
   receiving, by the home access gateway, a signaling message sent by the home access node, and forwarding the signaling message to the RNC according to the signaling connection mapping between the home access node and the RNC;
   receiving, by the home access gateway, downlink data sent according to the forwarding user plane information by the home access node, and forwarding the downlink data to the RNC according to the user plane connection mapping between the home access node and the RNC, based on the forwarding connection resource information; and
   receiving, by the home access gateway, uplink data sent by the RNC according to the forwarding connection resource information, and forwarding the uplink data to the home access node according to the user plane connection mapping between the home access node and the RNC based on the forwarding user plane information.

6. The soft handover method according to claim 1, wherein after the forwarding, by the home access gateway, the soft handover response to the home access node based on the forwarding user plane information, the method comprises:
   receiving, by the home access gateway, a soft handover ending request sent by the home access node, forwarding the soft handover ending request to the RNC according to the signaling connection mapping between the home access node and the RNC, deleting the signaling connection mapping between the home access node and the RNC, and the user plane connection mapping between the home access node and the RNC, and releasing the forwarding user plane information and the forwarding connection resource information.

7. A soft handover method, comprising:
   receiving, by a home access gateway, a soft handover request sent by a radio network controller (RNC), wherein the soft handover request comprises connection resource information of the RNC and an identifier of a home access node;
   establishing, by the home access gateway according to the identifier of the home access node, a signaling connection mapping between the RNC and the home access node, and forwarding the soft handover request to the home access node based on forwarding user plane information allocated to the home access node, wherein the forwarding user plane information comprises first information pointing to the home access gateway;
   receiving, by the home access gateway, a soft handover response returned by the home access node according to the soft handover request, wherein the soft handover response comprises user plane information of the home access node; and
   establishing, by the home access gateway, a user plane connection mapping between the home access node and the RNC according to (a) the user plane information of the home access node, (b) the forwarding user plane information, (c) forwarding connection resource information allocated to the RNC, and (d) the connection resource information of the RNC, and
   forwarding the soft handover response to the RNC based on the forwarding connection resource information, wherein the forwarding connection resource information comprises second information pointing to the home access gateway.

8. The soft handover method according to claim 7, wherein before the receiving, by the home access gateway, the soft handover request sent by the RNC, the method comprises:
   configuring, by the home access gateway, a physical Iur interface, to establish a signaling connection with the RNC; and
   receiving, by the home access gateway, a registration request from the home access node, determining an identifier of the home access node according to the registration request, and saving the identifier of the home access node.

9. The soft handover method according to claim 8, wherein the determining, by the home access gateway, the identifier of the home access node according to the registration request comprises one of the following:
   obtaining, by the home access gateway and from the registration request, a name of the home access node, and using the name of the home access node as the identifier of the home access node; and
   obtaining, by the home access gateway and from the registration request, scrambling code information of the home access node, and using the scrambling code information of the home access node as the identifier of the home access node.

10. The soft handover method according to claim 7, wherein after the forwarding, by the home access gateway, the soft handover response to the RNC based on the forwarding connection resource information, the method comprises one of the following:
   receiving, by the home access gateway, a signaling message sent by the RNC, and forwarding the signaling message to the home access node according to the signaling connection mapping between the home access node and the RNC;
   receiving, by the home access gateway, downlink data sent by the RNC according to the forwarding connection resource information, and forwarding the downlink data to the home access node according to the user plane connection mapping between the home access node and the RNC, based on the forwarding user plane information; and
   receiving, by the home access gateway, uplink data sent by the home access node according to the forwarding user plane information, and forwarding the uplink data to the RNC according to the user plane connection mapping between the home access node and the RNC, based on the forwarding connection resource information.

11. The soft handover method according to claim 7, wherein after the forwarding, by the home access gateway, the soft handover response to the RNC based on the forwarding connection resource information, the method comprises:

receiving, by the home access gateway, a soft handover ending request sent by the RNC, forwarding the soft handover ending request to the home access node according to the signaling connection mapping between the home access node and the RNC, deleting the signaling connection mapping between the home access node and the RNC, and the user plane connection mapping between the home access node and the RNC, and releasing the forwarding user plane information and the forwarding connection resource information.

12. A home access gateway, comprising a processor and a non-transitory processor-readable medium, having processor-executable instructions stored thereon, the processor-executable instructions including a plurality of modules, the modules including:

a request receiving module, configured to receive a soft handover request sent by a home access node, wherein the soft handover request comprises user plane information of the home access node and an identifier of a radio network controller (RNC);

a signaling relationship processing module, configured to establish, according to the identifier of the RNC, a signaling connection mapping between the home access node and the RNC, and forward the soft handover request to the RNC based on forwarding connection resource information allocated to the RNC, wherein the forwarding connection resource information comprises first information pointing to the home access gateway;

a response receiving module, configured to receive a soft handover response returned by the RNC according to the soft handover request, wherein the soft handover response comprises connection resource information of the RNC; and a user relationship processing module, configured to
establish a user plane connection mapping between the home access node and the RNC according to (a) the user plane information of the home access node, (b) the forwarding connection resource information, (c) forwarding user plane information allocated to the home access node, and (d) the connection resource information of the RNC, and forward the soft handover response to the home access node based on the forwarding user plane information, wherein the forwarding user plane information comprises second information pointing to the home access gateway.

13. The home access gateway according to claim 12, further comprising:

a interface configuration module, configured to configure a physical Iur interface, to establish a signaling connection with the RNC; and a identifier determination module, configured to receive a registration request from the home access node, determine an identifier of the home access node according to the registration request, and save the identifier of the home access node.

14. The home access gateway according to claim 13, wherein the identifier determination module is configured to obtain, from the registration request, a name of the home access node, and use the name of the home access node as the identifier of the home access node; alternatively, configured to allocate a coupling number to the home access node according to the registration request, and use the allocated coupling number as the identifier of the home access node.

15. The home access gateway according to claim 12, wherein the signaling relationship processing module is configured to delete the identifier of the RNC from the soft handover request, replace the user plane information of the home access node in the soft handover request with the forwarding connection resource information, and forward the soft handover request to the RNC.

16. The home access gateway according to claim 12, further comprising:

a signaling message forwarding module, configured to receive a signaling message sent by the home access node, and forward the signaling message to the RNC according to the signaling connection mapping between the home access node and the RNC;

a downlink data forwarding module, configured to receive downlink data sent by the home access node according to the forwarding user plane information, and forward the downlink data to the RNC according to the user plane connection mapping between the home access node and the RNC, based on the forwarding connection resource information; and a uplink data forwarding module, configured to receive uplink data sent by the RNC according to the forwarding connection resource information, and forward the uplink data to the home access node according to the user plane connection mapping between the home access node and the RNC, based on the forwarding user plane information.

17. The home access gateway according to claim 12, further comprising:

a ending request processing module, configured to receive a soft handover ending request sent by the home access node, forward the soft handover ending request to the RNC according to the signaling connection mapping between the home access node and the RNC, delete the signaling connection mapping between the home access node and the RNC, and the user plane connection mapping between the home access node and the RNC, and release the forwarding user plane information and the forwarding connection resource information.

18. A home access gateway, comprising a processor and a non-transitory processor-readable medium, having processor-executable instructions stored thereon, the processor-executable instructions including a plurality of modules, the modules including:

a request receiving module, configured to receive a soft handover request sent by a radio network controller (RNC), wherein the soft handover request comprises connection resource information of the RNC and an identifier of a home access node;

a signaling relationship processing module, configured to establish, according to the identifier of the home access node, a signaling connection mapping between the RNC and the home access node, and forward the soft handover request to the home access node based on forwarding user plane information allocated to the home access node, wherein the forwarding user plane information comprises first information pointing to the home access gateway;

a response receiving module, configured to receive a soft handover response returned by the home access node according to the soft handover request, wherein the soft handover response comprises user plane information of the home access node; and a user relationship processing module, configured to
establish a user plane connection mapping between the home access node and the RNC according to (a) the user plane information of the home access node, (b) the forwarding user plane information, (c) forwarding connection resource information allocated to the RNC, and (d) the connection resource information of the RNC, and forward the soft handover response to the RNC based on the forwarding connection resource information, wherein the forwarding connection resource information comprises second information pointing to the home access gateway.

19. The home access gateway according to claim 18, further comprising:
a interface configuration module, configured to configure a physical Iur interface, to establish a signaling connection with the RNC; and
a identifier determination module, configured to receive a registration request from the home access node, determine the identifier of the home access node according to the registration request, and save the identifier of the home access node.

20. The home access gateway according to claim 19, wherein the identifier determination module is configured to obtain, from the registration request, one of the following: (a) a name of the home access node, and (b) scrambling code information of the home access node, which is used as the identifier of the home access node.

21. The home access gateway according to claim 18, further comprising:

a signaling message forwarding module, configured to receive a signaling message sent by the RNC, and forward the signaling message to the home access node according to the signaling connection mapping between the home access node and the RNC;

a downlink data forwarding module, configured to receive downlink data sent by the RNC according to the forwarding connection resource information, and forward the downlink data to the home access node according to the user plane connection mapping between the home access node and the RNC, based on the forwarding user plane information; and a uplink data forwarding module, configured to receive uplink data sent by the home access node according to the forwarding user plane information, and forward the uplink data to the RNC according to the user plane connection mapping between the home access node and the RNC, based on the forwarding connection resource information.

22. The home access gateway according to claim 18, further comprising:
a ending request processing module, configured to receive a soft handover ending request sent by the RNC, forward the soft handover ending request to the home access node according to the signaling connection mapping between the home access node and the RNC, delete the signaling connection mapping between the home access node and the RNC, and the user plane connection mapping between the home access node and the RNC, and release the forwarding user plane information and the forwarding connection resource information.

* * * * *